(12) United States Patent
Zou et al.

(10) Patent No.: US 11,829,225 B2
(45) Date of Patent: Nov. 28, 2023

(54) PARTIAL PANEL SCREEN DIMMING

(71) Applicant: INTEL CORPORATION, Santa Clara, CA (US)

(72) Inventors: Lunkai Zou, Shenzhen (CN); Hua-Mei Yang, Taipei (TW); Yiming He, Shenzhen (CN); Feng-Ming Yang, Taipei (TW); Ajay Saini, Hillsboro, OR (US); Ahmed Omer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 17/184,477

(22) Filed: Feb. 24, 2021

(65) Prior Publication Data

US 2021/0181827 A1    Jun. 17, 2021

Related U.S. Application Data

(63) Continuation-in-part of application No. PCT/CN2020/086735, filed on Apr. 24, 2020, and a
(Continued)

(51) Int. Cl.
*G06F 1/3234* (2019.01)
*G09G 3/20* (2006.01)
(Continued)

(52) U.S. Cl.
CPC .......... *G06F 1/3265* (2013.01); *G06F 1/3231* (2013.01); *G09G 3/2007* (2013.01);
(Continued)

(58) Field of Classification Search
CPC .... G06F 1/3265; G06F 1/3231; G06F 3/0481; G09G 3/2007; G09G 3/3208; G09G 3/36;
(Continued)

(56) References Cited

U.S. PATENT DOCUMENTS 9,378,688 B2    6/2016  Brush
10,852,905 B1 *  12/2020  Guzman ........... H04M 1/72454
(Continued)

FOREIGN PATENT DOCUMENTS

CN    101676982 A    3/2010
CN    103035209 A    4/2013
(Continued)

OTHER PUBLICATIONS

International Patent Office—International Search Report and Written Opinion dated Oct. 26, 2020 for International Patent Application PCT/CN2020/086735, 10 pages.
(Continued)

*Primary Examiner* — Brent D Castiaux
(74) *Attorney, Agent, or Firm* — Schwabe, Williamson & Wyatt, P.C.

(57) ABSTRACT

Embodiments may include systems, techniques, methods, apparatus and/or device to receive an input selecting one or more areas of a display of the computing device, leaving one or more other areas of the display unselected, and to apply a masking layer to mask either pixels of the one or more selected areas or pixels of the one or more unselected areas to cause the masked pixels to be dimmed, to reduce power consumption by the display. Embodiments may further include where the one or more of the selected areas include a focus area of interest, and to apply the masking layer to mask pixels of the one or more unselected areas to cause the masked pixels to be dimmed. Embodiments may be implemented via software without directly interacting with hardware. Other embodiments may be described or claimed.

17 Claims, 30 Drawing Sheets

Related U.S. Application Data continuation-in-part of application No. 16/800,944, filed on Feb. 25, 2020, now abandoned.

(51) Int. Cl.
  *G06F 1/3231* (2019.01)
  *G09G 3/36* (2006.01)
  *G09G 3/3208* (2016.01)

(52) U.S. Cl.
  CPC .............. *G09G 3/3208* (2013.01); *G09G 3/36* (2013.01); *G09G 2320/0686* (2013.01); *G09G 2330/022* (2013.01); *G09G 2354/00* (2013.01)

(58) Field of Classification Search
  CPC ......... G09G 3/3426; G09G 2320/0686; G09G 2330/022; G09G 2330/021; G09G 2354/00; Y02D 10/00
  See application file for complete search history.

(56) References Cited

U.S. PATENT DOCUMENTS

| | | | |
|---|---|---|---|
| 2003/0146897 A1* | 8/2003 | Hunter | .................... G09G 3/342 345/102 |
| 2006/0087502 A1* | 4/2006 | Karidis | ................. G06F 1/3218 345/211 |
| 2012/0288139 A1 | 11/2012 | Singhar | |
| 2014/0375702 A1 | 12/2014 | Cho | |
| 2015/0338984 A1 | 11/2015 | Hunt | |
| 2015/0339046 A1* | 11/2015 | Hegde | ................. G06F 3/04886 715/798 |
| 2018/0286080 A1 | 10/2018 | Marshall | |
| 2019/0121420 A1* | 4/2019 | Kaza | .................... G06F 1/3218 |

FOREIGN PATENT DOCUMENTS

| | | |
|---|---|---|
| CN | 103377624 A | 10/2013 |
| CN | 110286740 A | 9/2019 |

OTHER PUBLICATIONS

United States Patent Office—Office Action dated Jan. 4, 2021 from U.S. Appl. No. 16/800,944, 28 pages.

United States Patent Office—Final Office Action dated May 3, 2021 from U.S. Appl. No. 16/800,944, 38 pages.

\* cited by examiner

PARTIAL PANEL SCREEN DIMMING

RELATED APPLICATION

This application is a continuation-in-part application which claims priority under 35 USC 120 to U.S. application Ser. No. 16/800,944, filed Feb. 25, 2020, entitled SOFTWARE BASED PARTIAL DISPLAY DIMMING, and to PCT Application number PCT/CN2020/086735, filed Apr. 24, 2020, entitled PARTIAL PANEL SCREEN DIMMING, which designated various states including the United States. The Specifications of U.S. application Ser. No. 16/800,944 and PCT Application number PCT/CN2020/086735 are hereby fully incorporated by reference, in their entirety.

BACKGROUND

The present disclosure relates to the fields of computing and electronic devices, and more specifically to the reduction of electrical power consumed by a display of an electronic device.

In many electronic devices, such as laptop and notebook computers and mobile devices such as smart phones, a display of the electronic device is one of the highest power consuming components of the electronic device. These types of electronic devices are typically powered by battery power during use at least some of the time. Thus, this relatively high-power consumption of the display in such electronic devices reduces the battery life when the electronic device is being operated on battery power, where the battery life is the time for which the battery can power the electronic device.

DETAILED DESCRIPTION

Figure 1:
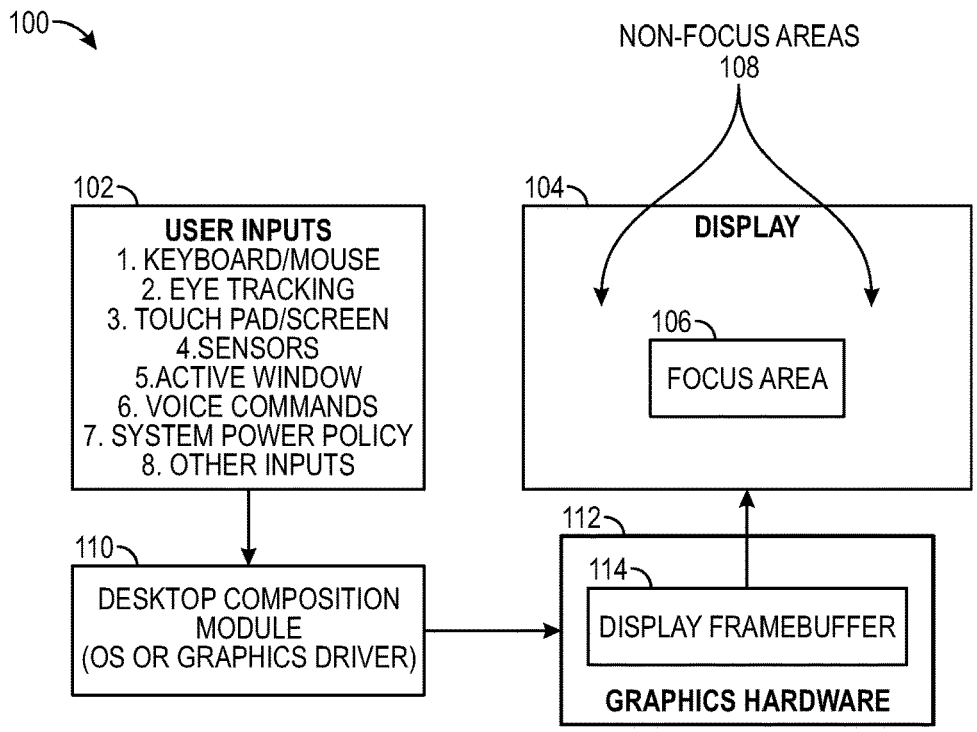
FIG. 1 is a functional diagram illustrating a display power-reduction system and process according to one embodiment of the present disclosure.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Embodiments described herein may be directed to methods, apparatus, and techniques to implement software-based partial panel screen dimming to save the backlight power and extend system battery life. In embodiments, during operation, electronic devices incorporated with the technology of the present disclosure may use as little as 50% or less of the power required for backlighting compared to legacy implementations. As a result, system battery life may be extended by 30% or more. In embodiments, a mask may be to apply to a display, and identifying one or more regions on the display with different transparency levels. These different transparency levels of the mask may be used for dimming graphics on a display. The mask for dimming may be subsequently sent to a graphics composition system for display on one or more displays. These techniques may be applied using a software-based approach.

Embodiments may include systems, techniques, methods, apparatus and/or device to receive an input selecting one or more areas of a display of the computing device, leaving one or more other areas of the display unselected, and to apply a masking layer to mask either pixels of the one or more selected areas or pixels of the one or more unselected areas to cause the masked pixels to be dimmed, to reduce power consumption by the display. Embodiments may further include where the one or more of the selected areas include a focus area of interest, and to apply the masking layer to mask pixels of the one or more unselected areas to cause the masked pixels to be dimmed. Embodiments may further include where the focus area includes an active application window. Embodiments may further include modification of the masking layer, in response to the selection of the focus area or in response to changing dimensions of the focus area.

Embodiments may further include application of the masking layer to mask pixels of the one or more unselected areas to cause the masked pixels to be dimmed, including application of the masking layer to mask pixels of the one or more unselected areas to cause the masked pixels to be dimmed non-uniformly. Embodiments may further include receiving of the input selecting the one or more areas of the display from a user input device of the computing device. Embodiments may further include where the masking layer includes transparency layers associated with the pixels to be dimmed, and application of the masking layer comprises alpha blending the transparency layers associated with the pixels to be dimmed to respectively dim the pixels.

In legacy implementations, the display is one of the highest power consuming components in a notebook, laptop, phone, or other portable computing system having one or more displays. In legacy computing or audiovisual devices, display power may consume 44%+/- of the system power consumption. In these legacy devices, backlight power may consume 50% or more of that. Different legacy display technologies may consume higher power, for example on organic light-emitting diode (OLED) or high dynamic range (HDR) types of panels. In embodiments, minimizing the panel backlight power will extend battery operated use of laptops, notebooks, or other portable computing systems that use displays. In addition, embodiments may also help extend operational use of the device and the life of batteries or other power sources within the device.

Embodiments described herein may be accomplished using a software approach at an application level, may operate on existing hardware and graphics driver stacks. These embodiments may manipulate the display in the input stage, in contrast to the output stage that requires specialized hardware components. Embodiments implemented through software provide more flexibility for adapting to different operating systems and to different display panels, such as to 6 bit/8-bit LCD and OLED panels. Embodiments implemented through software may also support different display form factors such as single, dual (physical and virtual, such as foldable displays), and secondary displays. Note: as used herein, display and screen may be used interchangeably.

The advantage of implementing embodiments in software include decreased cost by not requiring specialized hardware. These embodiments may only use a basic display driver for support, for example a graphics driver. These embodiments are not deeply coupled with a graphics driver, or composition layer, and have no system hardware dependency such that architectural changes to system configurations will not affect the implementation of the embodiments. In addition, embodiments may require only a minimal set of operating system (OS) support such as pixel blending and mouse event handling. For example, on a Windows® platform, embodiments may not require any extra changes to the OS or display drivers. Embodiments may function as a simple background application.

In contrast with legacy implementations provide dimming on the hardware side or the graphic driver side, embodiments described herein may not be deeply coupled with the graphics driver or composition layer of the computing device, and may have no system hardware dependency. For example, implementations may not be impacted by any architectural changes to graphics driver or hardware of the computing device. Embodiments may just add an input layer to the composition system. The graphics input is naturally supported. This is in contrast to a hardware or driver specific solution, where output is usually protected and less accessible due to security concerns for the device. For example, the output buffer for displaying passwords should prevent access from third party driver or software. For example, the output buffer for displaying digital rights management (DRM)-protected video should prevent access from a third party driver or software.

Embodiments described herein have the ability to manipulate display content, in addition to manipulating flexible features sets built into the user interface (UI) that may take care of software presets and/or user prompt interactions. As a result, embodiments may be able to instantly or nearly instantly enable or disable partial screen dimming function on the display, define focus or non-focus areas on a display, implement various dimming levels, which may be referred to as transparency levels, on areas of the display. In addition, embodiments may restrict unintended user actions that may result in unintended exposure of areas on the display.

Embodiments using a software approach for partial panel screen dimming may also provide an end-user with additional privacy control. For example, when the user is sharing a display the user may want to completely dim everything other than the a particular area of the display, for example for use over a videoconferencing system. In addition, during presentation of a display to others, the end user may want to dim various portions of the screen to highlight areas to focus on during the presentation.

Embodiments may have little to no dependency on the architecture of the computing system, and may require only a minimal set of operating system support. Specifically, for Windows™ platforms, embodiments may not require any extra changes to the operating system or display driver. Embodiments may work as a simple background application. In contrast with legacy implementations which operate on the output stage, embodiments described herein may just add an input layer to the composition system. The graphics input of a device is naturally supported whereas the output is usually protected and less accessible due to security concerns.

FIG. 1 is a functional diagram illustrating a display power-reduction system 100 according to one embodiment of the present disclosure. In operation, the system 100, which may also be described as a process 100, may receive user inputs 102 and based on these user inputs, the system controls the rendering or display of content on a display 104 inside or outside one or more focus areas 106 on the display. In embodiments, these user inputs 102 may include a keyboard/mouse, eye tracking, touchpad or a touch screen, sensors, identification of an active window on the display 104, voice commands, system power policies, or other inputs. In embodiments, the system 100 may also control dimming of the display 104 in one or more non-focus areas 108 of the display 104 to thereby reduce power consumption of the display, as will be explained in more detail below.

In embodiments, system 100 having one or more focus areas 106 of the display 104 may remain active, either being viewed by the user or are the most likely to be viewed by the user. These focus areas 106, as a result, may be maintained at a configured brightness. The system 100 may determine these focus areas 106 based on the user input 102. system 100. In embodiments, the brightness or the amount of dimming with respect to a brightness may be applied to the inactive or non-focus areas 108 of the display 104. In embodiments, non-focus areas 108 may be areas not being viewed or are less likely as being viewed by the user. In embodiments, the dimming may include becoming completely opaque, or completely darkened. In embodiments, these system 100 non-focus areas 108 may be based on the user inputs 102. This maintaining of the intensity or brightness of the focus areas 106 while dimming the non-focus areas 108 on the display may be referred to as "partial dimming" in the present application.

The user inputs 102 utilized in the display power-reduction system 100 may include a wide variety of different types of inputs provided by or received from a user, or through settings or from software running in the environment in which the system 100 is being implemented. The system 100 would typically be implemented in a portable electronic device such as, for example, a smart phone, tablet computer, or laptop computer, but is not limited to being implemented in these types of electronic devices. The display power-reduction system 100 may be implemented in any other suitable type of electronic device including a display and which may benefit from reducing the power consumption of the display. In such an environment, the user inputs 102 received in the display power-reduction system 100 may include cursor information received from a mouse, keystroke information received from a keyboard, touch information received from a touch screen of the display 104, a position of or movement of the eyes of the user indicating a location on the display where the user is looking, voice commands from the user or a power policy setting of the electronic device including the display, software running on the electronic device, or through manual input from the user. In some embodiments, where the display 104 includes a touch screen, the system 100 may identify the focus area or areas 106 based on locations on the display 104 that are touched (or not touched) by the user. Alternatively, in some embodiments the system 100 may determine the focus area 106 based on where a cursor is positioned (or not positioned) on the display 104. These user inputs 102 are provided by way of example, and the display power-reduction system 100 is not limited to utilizing only some or all these user inputs, but may utilize other inputs in addition to or in place of these example user inputs.

In some embodiments, the user inputs 102 also include an input that enables and disables execution of the display power-reduction system 100. For example, where the user inputs 102 include a power policy setting, the system 100 may be activated or enabled once a charge level of a battery of the electronic device including the display 104 drops below a selected charge percentage. Similarly, once the charge level of the battery reaches a selected threshold after being charged, the system 100 may then be deactivated or disabled. In some embodiments, the user inputs 102 may include an ON/OFF parameter that is manually selectable or input by the user to thereby enable the user to manually enable and disable execution of the display power reduction system 100. This allows the user to manually select execution of the system 100 independent of the other user input 102. For example, where the user is almost done with a task being performed on the electronic device and the battery reaches a level that causes the system 100 to be operated, the user may, through the ON/OFF parameter, disable the process and finish the task under normal operating conditions of the electronic device.

In the display power-reduction system 100, once the user inputs 102 are collected or received, these inputs are processed by a desktop composition module (DCM) 110 to control partial dimming of the display 104. The DCM 110 is a software component may execute as part of (or an add on to) an operating system (OS) of the electronic device including the display 104, executes as part of (or an add on to) a graphics driver of the electronic device, or executes as part of (or add on to) both the OS and graphics driver. The DCM 110 implements the partial dimming of the display 104 and part of this overall process includes compositing windows manager functionality that composites contents or images of multiple applications executing on the electronic device into a desktop screen or image to be displayed on the display 104. Where the electronic device includes more than one display 104, as will be described in more detail below with reference to FIG. 2, the DCM 100 composites images from the running applications into a desktop image that is displayed on these multiple displays.

The operation of a compositing windows manager, such as the desktop windows manager (DWM) in the Windows operation system, and a graphics driver will be understood by those skilled in the art, and thus these software component will not be described in detail herein. Aspects of the operation of the graphics driver and compositing windows manager that are part of the overall operation of the DCM 110 will, however, now be briefly described to enable a better understanding of aspects of the partial dimming of the display 104 implemented through the DCM in the system 100. As seen in FIG. 1, the electronic device in which the system 100 is implemented includes graphics hardware 112, which includes a graphics processing unit (GPU) (not shown) of the device. The graphics driver is a software component that allows the OS, as well as programs or applications executing on the electronic device, to control the graphics hardware 112 to display desired images on the display 104.

Each application executing on the electronic device is displayed in a corresponding window on the desktop displayed on the display 104. An image to be displayed by each executing application is stored in a corresponding off-screen buffer associated with each window on the display 104. During execution of the applications, the images stored in the corresponding off-screen buffers are occasionally updated and the compositing windows manger thereafter processes each of the updated images as part of generating a corresponding composite image to be displayed as the desktop on the display 104. The processing of these respective images in the off-screen buffers may include applying 2D and 3D effects, and may include operations such as blending, fading, scaling, rotation, duplication, bending and contortion, shuffling, blurring, redirecting applications, translating windows into one of a number of displays and virtual desktops, and other graphics-related operations, as will be understood by those skilled in the art. The graphics hardware 112 generates the composite image that is then stored in a display framebuffer 114 as seen in FIG. 1, with this stored composite image being stored in either dedicated memory or system memory (not shown) and thereafter being displayed as the desktop on the display 104.

Returning to the description of the DCM 110, the DCM includes either a modified compositing windows manager, a modified graphics driver, or a modified compositing manager and graphics driver, to implement partial dimming on the display 104. Each of the compositing windows manger and graphics driver is a software component, and thus modification of these components includes programming instructions added to one or both of these components to implement the partial dimming functionality. In operation, the DCM 100 receives the user inputs 102 and from these user inputs determines one or more focus areas 106 on the display 104 that are to remain active (e.g., the intensity or brightness in these focus areas are maintained). The DCM also determines, based on the user input 102, one or more non-focus areas 104 of the display 104 which are to be dimmed (e.g., the intensity or brightness in these non-focus areas are to be reduced or dimmed). The DCM 110 thereafter, through execution of the modified compositing windows manager, modified graphics driver, or modified compositing windows manager and graphics driver, dims the one or more non-focus areas 108 of the display to be dimmed to reduce a power consumption of the display 104.

The specific way the DCM 110 controls the dimming of the non-focus areas 108 on the display 104 will depend on the specific type of the display. For example, where the display 104 is an organic LED (OLED) display, the DCM may dim (e.g., reduce the intensity or brightness of) at least some of the pixels of the display 104 in the one or more non-focus areas 108 of the display to be dimmed. This dimming of the non-focus areas 108 may include changing a color of at least some of the pixels of the display 104 in the one or more non-focus areas 108. The color of these pixels may, for example, be changed to a darker color, such as blue or black. Where the display 104 includes segmented LED backlighting, the dimming may include turning OFF one or more segments of the backlighting of the display. For example, the display 104 may be an LCD with mini LED backlighting where dimming is performed by controlling groups of the mini LEDs.

Figure 2:
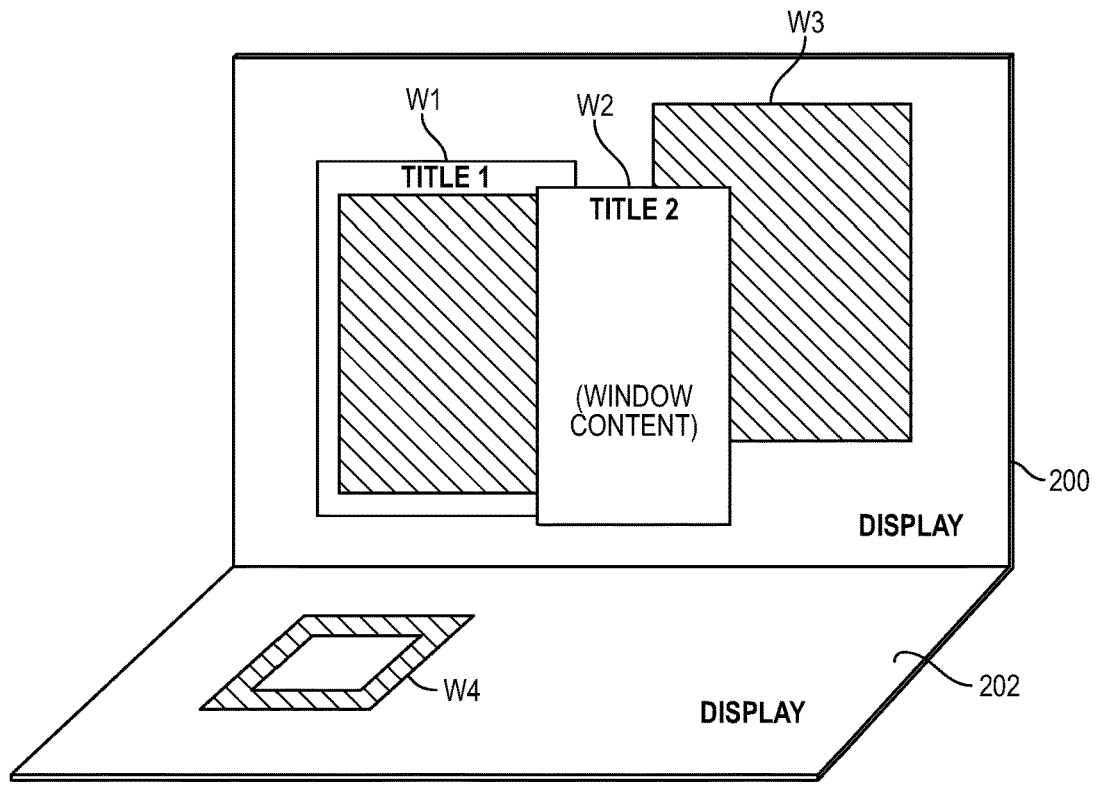
FIG. 2 illustrates multiple displays in which the process of FIG. 1 may change characteristics of multiple windows being presented on each display to reduce power consumption of the displays according to one embodiment.

FIG. 2 illustrates multiple displays 200 and 202 in which the system 100 of FIG. 1 may change characteristics of multiple windows W1 W2, W3, W4 being presented on the multiple displays to reduce overall power consumption of the displays according to one embodiment. The windows W1-W3 are presented on the display 200 and window W4 on display 202. In such a multiple display electronic device, the system 100 may implement partial dimming on each of the display 200, 202. Furthermore, in such a multiple display device one of the displays 200, 202 may not be utilized by a user at certain times. For example, assume the window W4 is not being displayed on the display 202 such that no windows are presented on this display. In this situation, the dimming performed by the system 100 may include dimming the entire display 202. The partial dimming implemented by the system 100 may include dimming the entire display for one or more of the displays 200, 202 in a multiple display device.

FIG. 2 also illustrates that dimming performed by the system 100 in each of the windows W1-W4 may vary in different embodiments. In the example to be discussed, assume the window W4 is not displayed on the display 202 such that no windows are present on this display. In this situation, the windows W1-W3 are present on the display 200 and the window W2 is the active window (e.g., is the focus area on the display 200). The windows W1 and W3 are inactive or non-focus areas on the display 200 in this example. The system 100 will accordingly dim the windows W1 and W3. FIG. 2 shows two examples of how this dimming within a given inactive window (e.g., in non-focus areas) may be performed. In the window W3, the entire window is dimmed. Thus, each of the pixels in the window W3 is set to black or changed to some other darker color to reduce the power consumption of the display 200 due to displaying the window W3. Where the display 200 includes segmented LED backlighting, dimming window W3 may include turning off one or more segments of the backlighting of the display. The window W1 shows another possible way of dimming an inactive window corresponding to a non-focus area of the display. The window W1 includes a border around the perimeter of the window that is not dimmed but remains illuminated by the DCM 110 (FIG. 1) while an interior of the window W1 inside this border is dimmed.

Other embodiments include other ways of dimming inactive windows (e.g., non-focus areas) on a display. For example, dimming inactive windows or non-focus areas occurs in different ways in further embodiments, such as by changing colors in the inactive windows or non-focus areas, or through gradient dimming within the inactive windows or non-focus areas, or through gradient dimming at edges between the one or more focus areas and the non-focus areas. The inactive windows or non-focus areas may be defined through eye tracking to identify a moving focus area (active window or windows) and non-focus areas (inactive window or windows) in the other areas of the display.

In other embodiments, the size of the entire screen being displayed can be shrunk to a smaller area (focus area) on the display, with the remaining area (non-focus area) on the screen being dimmed or turned OFF. In other embodiments a window or windows associated with a given app are defined as the active window or windows and thereby as the focus area that is not dimmed, or is dimmed in a particular manner, while the windows of other apps are defined as non-focus areas and are accordingly dimmed.

In another embodiment, portions of each active window of a given app may also be dimmed such as by dimming an edge portion of each active window for the given app, which is illustrated for the window W4 in FIG. 2. Thus, where the window W4 is an active window of a particular app running on an electronic device, this active window W4 may be dimmed around the edges of the window as shown. Content being presented by the app is displayed on the interior portion of the active window W4 in this embodiment, which is represented by the interior white portion of the window W4. The dimming around the edge of the active window W4 could alternatively be a gradient dimming, or this dimming could be done through displaying a particular color in the edge portion of the window, or through other suitable dimming techniques that reduce power consumed by the display 202 in displaying the window W4.

In another embodiment, a user may provide manual input, such as through touch input, voice input, or keystrokes, to instantly enable the display power reduction system 100 on the corresponding electronic device. The user could similarly disable the system 100 through manual input in this embodiment. Also, in this embodiment, the user could provide other manual input after enabling the system 100 to thereby provide various inputs that control the operation of the system 100, such as providing levels of dimming to be provided. In another embodiment, the user may also manually define focus and non-focus areas, or active and non-active windows through suitable manual input such as touch input, voice input, or keystrokes. For example, the user could through a first type of touch stroke on the display define a focus area or areas and through a second type of touch stroke define non-focus areas on the display.

Figure 3:
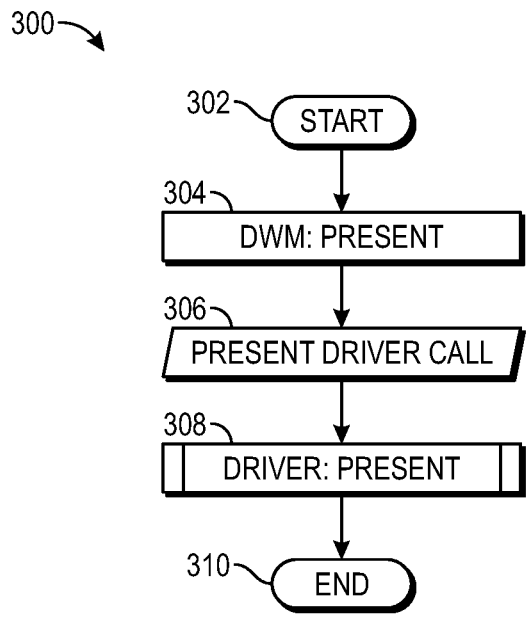
FIG. 3 is a flowchart illustrating a desktop composition process according to one embodiment.

FIG. 3 is a flowchart illustrating a desktop composition process 300 that is part of the display power-reduction system 100 according to one embodiment. The process 300 is an example of a process executed by the windows compositing manager, which in the example of FIG. 3 is the DWM in the Windows OS. FIGS. 3-7 illustrate an example embodiment of the DCM 110 implemented in the Windows OS such that the compositing windows manager is DWM and the partial dimming is implemented through a modified graphics driver of the electronic device. The desktop composition process 300 starts at 302 and proceeds immediately to 304 where the DWM makes a Present call, where Present is a function of the DWM that calls the graphics driver. Next, the process 300 at 306 and 308 receives from the graphics driver the partial dimming modified image data of each of the windows being displayed on the desktop. At 308, the process 300 provides the composite image as modified by the partial dimming modified image data to the display framebuffer 114 (FIG. 1) for display on the display 104.

Figure 4:
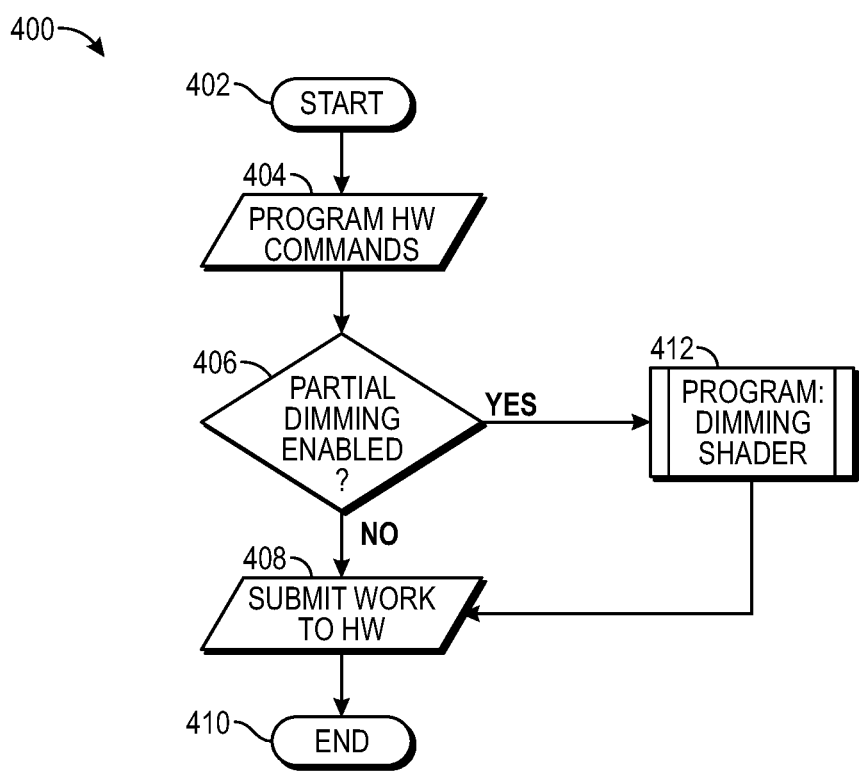
FIG. 4 is a flowchart illustrating a graphics driver process that performs partial display dimming when called by the desktop composition process of FIG. 3 according to an embodiment.

FIG. 4 is a flowchart illustrating a graphics driver process 400 corresponding executed by the graphics driver in response to the Present call from the DWM executing the desktop composition process 300 of FIG. 3. The process 400, at 402, starts and then proceeds to 404 in which the graphics driver generates commands for programing the graphics hardware 112 (FIG. 1). Next, at 406, the process 400 determines whether partial dimming of the display 104 is enabled. If the determination at 406 is negative, the process 400 proceeds to 408 and the programmed hardware commands are submitted to the graphics hardware 112. Next, the process 400 at 410 terminates. Where the determination at 406 is positive, the process at 412 executes a dimming shader program or process to perform partial dimming of the desktop image, as will be described in more detail below with reference to FIG. 5. The process 400 thereafter terminates at 410.

Figure 5:
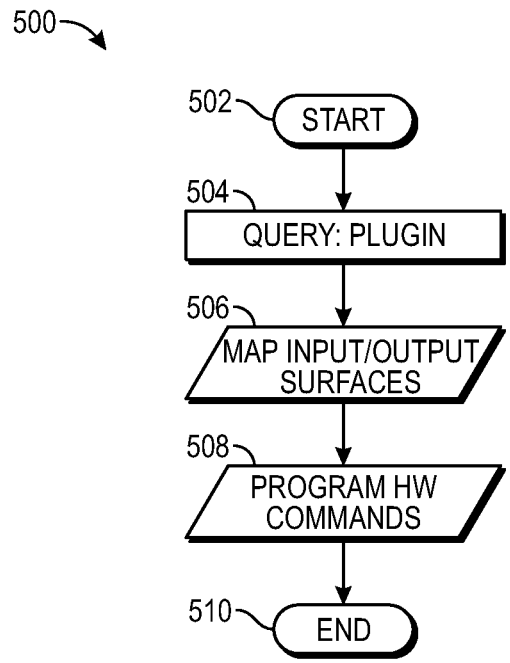
FIG. 5 is a flowchart illustrating a dimming shader process called by the graphics driver process of FIG. 4 when partial display dimming is enabled.

FIG. 5 is a flowchart illustrating a dimming shader process 500 called by the graphics driver process 400 of FIG. 4 when partial display dimming is enabled as determined at 406 of the process 400. The process 500 starts at 502 and proceeds to 504 where a query function is executed in the form of a query plugin in the example embodiment of FIG. 5. The query plugin obtains user inputs 102 from the OS and utilizes these inputs to determine which areas on the display 104 are focus areas 106 (e.g., are not to be dimmed) and which areas are non-focus areas 108 (e.g., are to be dimmed). Next, the process 500 at 506 maps input and output surfaces using data from the query plugin executed at 504 and these mapped input and output surfaces are utilized to modify the composited desktop image to perform partial dimming on this image. At 508 the process 500 programs the graphics hardware 112 (FIG. 1) to perform the determined partial dimming. The process 500 then terminates at 510.

Figure 6:
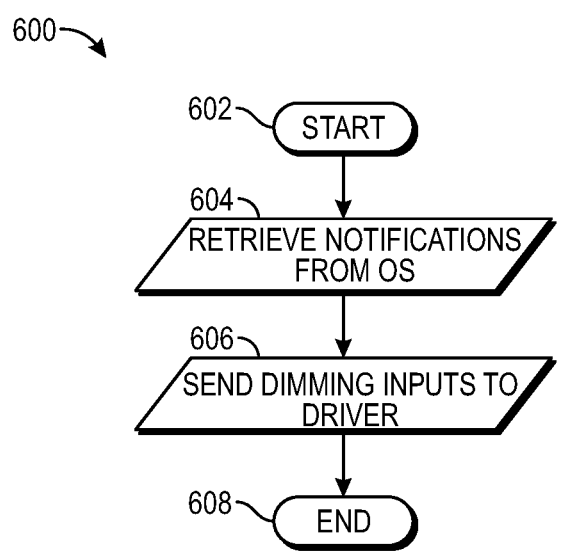
FIG. 6 is a flowchart illustrating a query plugin process utilized by the dimming shader process of FIG. 5 to process inputs identifying regions of the display to be dimmed.

FIG. 6 is a flowchart illustrating a query plugin process 600 executed by the query plugin executed by the process 500 at 504. The process 600 starts at 602 and to 604 at which the process receives user input 102 in the form of notifications from the OS of the electronic device. The OS maintains information on the size and location of opened windows on the display 104, and the process 600 at 604 retrieves this information as well for use by the graphics driver programming the graphics hardware 112 to perform the desired partial dimming. Next, at 606 the process 600 provides the retrieved user inputs 102 and from the OS to the dimming shader process 500 for use in partial dimming of the display 104.

Figure 7:
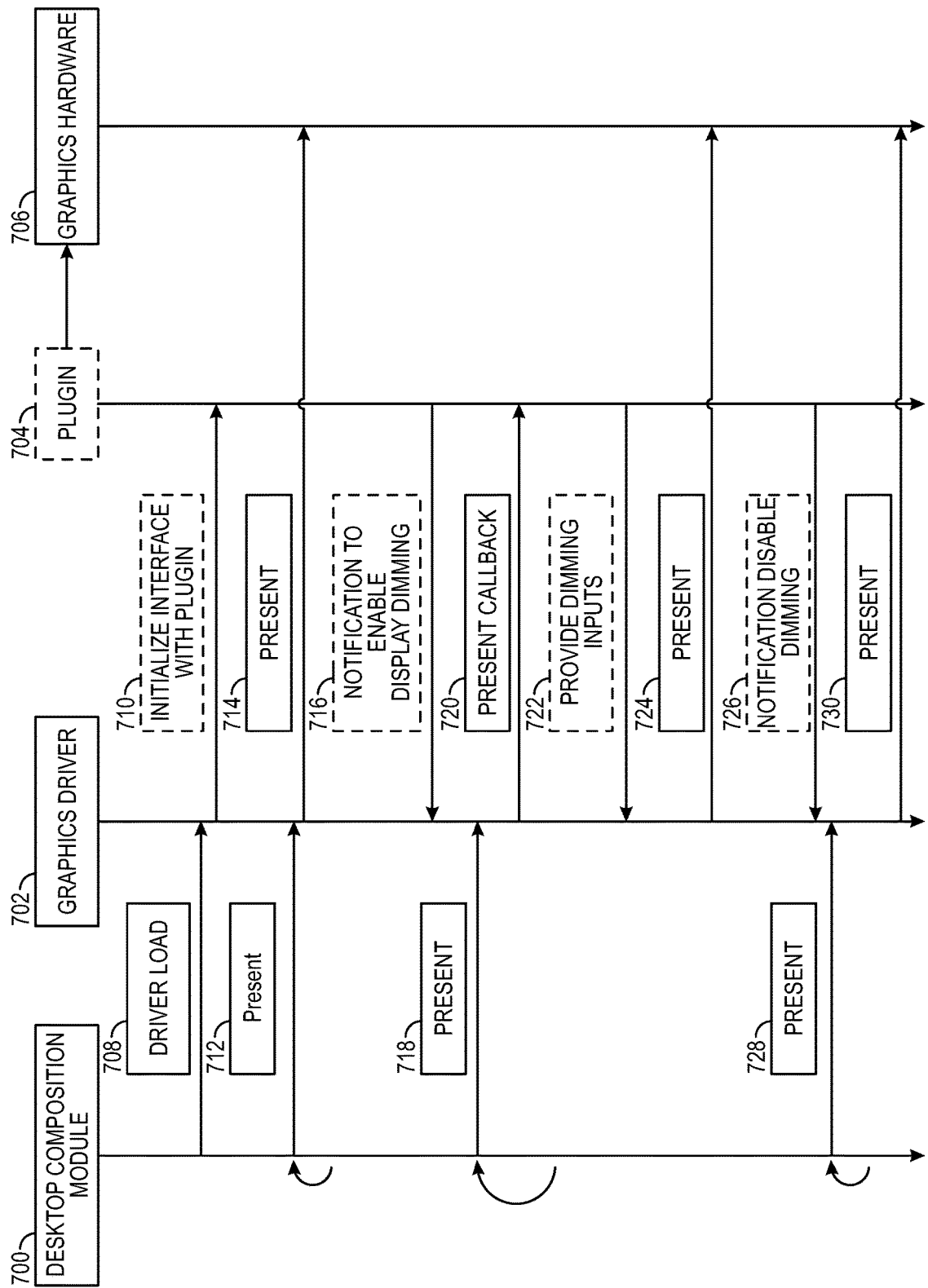
FIG. 7 is a sequence diagram illustrating operation of the various software components that implement a display power-reduction process according to the embodiments of FIGS. 3-6.

FIG. 7 is a sequence diagram illustrating operation of the various software components of FIGS. 1-6 that implement the desktop composition process 300 of FIG. 3 including partial dimming implemented by the graphics driver in this embodiment. In the embodiment of FIG. 7, the white boxes illustrate existing components and operation while the gray shaded boxes illustrate new components included to perform the desired partial dimming. Along the top of the sequence diagram of FIG. 7 are shown the pertinent software components, namely desktop composition module 700, graphics driver 702, plugin 704 and graphics hardware 706. Each of these components 700-706 corresponds to components previously described with reference to FIGS. 1-6.

As shown in FIG. 7, the desktop composition module 700 load the graphics driver 702 at 708 and at 710 the graphics driver initializes the plug in 704. At this point, the partial dimming is not enabled since the partial dimming is only utilized in the electronic device when necessary. As a result, at 712 when the desktop composition module 700 initially makes a Present call to the graphics driver 702, the Present call at 714 from the graphics driver to the graphics hardware 706 results in programming of the graphics hardware in a conventional manner to display the composite desktop image on the display 104 (FIG. 1).

At 716, the plugin 704 determines that partial dimming is to be performed and provides a notification to the graphics driver 702 indicating partial dimming is now enabled. As a result, at 718, when the desktop composition module 700 makes a Present Call to the graphics driver 702, a call to the plug in 704, which is indicated as a Present Callback at 720, is made and the plugin 704 returns at 722 dimming inputs to the graphics driver 702. These dimming inputs include the notifications retrieved from the OS as discussed above with reference to FIG. 6. Next, at 724 the graphics driver 720 makes a Present call to program of the graphics hardware 706 to perform the required partial dimming and display the composite desktop image on the display 104 (FIG. 1) including this partial dimming. At 726, the plugin 704 provides a notification that partial dimming to be disabled, such as would typically occur when the battery of the electronic device has been recharged, and because of this, or for some other reason, the partial dimming is no longer required. For example, the user may manually disable partial dimming, as discussed above. After partial dimming has been disabled at 726, when the desktop composition module 700 makes another Present call at 728 to the graphics driver 702, and the graphics driver makes a Present call at 730 that results in programming of the graphics hardware 706 at 730 in a conventional manner to display the composite desktop image on the display 104 (FIG. 1).

Figure 8:
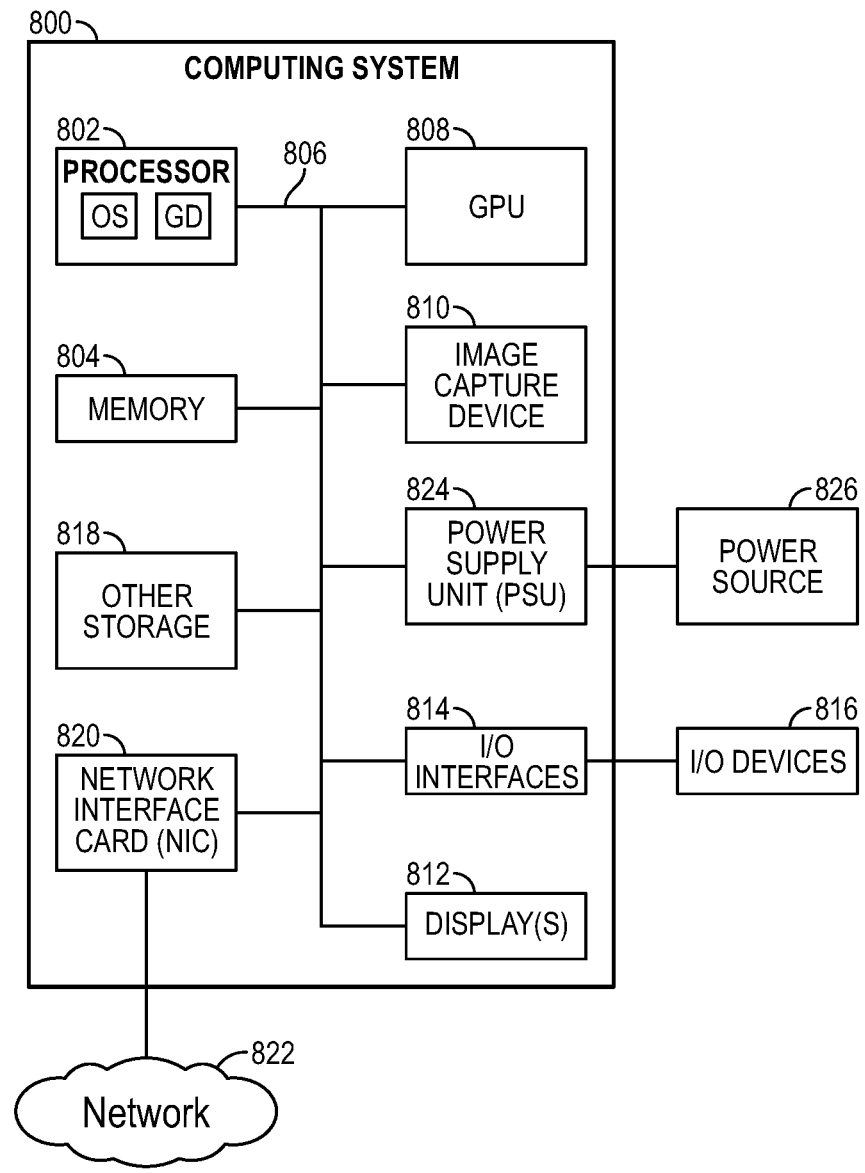
FIG. 8 is a functional block diagram of an example computer system illustrating a sample environment in which embodiments of the present disclosure may be implanted.

FIG. 8 is a functional block diagram illustrating an example of a computing system 800 to implement the display power-reduction techniques discussed herein with reference to the embodiments of FIGS. 1-7. The computing system 800 may be, for example, a mobile device such as a smart phone, laptop computer, ultrabook, tablet computer, a desktop computer, or a server or other type of computer system that would benefit from the display power-reduction techniques of the present application. The computer system 800 would typically be a mobile device running on battery power, which would then utilize the display power-reduction techniques of the present application to extend the life of battery for a given charge by lowering the power consumption of the system. The computer system 800 need not be a mobile device, however, where there is a need to reduce the power consumption of the system even though the deice is not being powered through battery power. Finally, the computer system 800 of FIG. 8 illustrates an example of a suitable computing system environment in which embodiments of the present disclosure may be implemented. The computing system 800 is an example of one suitable computing environment should not be considered to suggest any limitation as to the implementations of embodiments of the present disclosure.

In the example embodiment of FIG. 8, the computing system 800 includes a processor 802, such as a central processing unit, which is configured to execute stored instructions. A memory device 804 stores instructions that are executable by the processor 802, and may be any suitable type of memory such as read only memory (ROM), dynamic random access memory (DRAM), static random access memory (SRAM), flash memory (FLASH), or a combination these and other different types of memory. The memory device 804 stores instructions executed by the processor 802, including instructions of OS and graphics driver GD loaded into memory, and instructions executed by the processor to implement the display power-reduction processes of FIGS. 1-7. The processor 802 is coupled to the memory device 804 through a bus 806 of the computer system 800. The processor 802 may be a single core processor, a multi-core processor, a computing cluster, or any number of other configurations. Furthermore, the computing system 800 may include more than one processor 802 and more than one memory device 804.

The computing system 800 further includes a graphics processing unit (GPU) 808, and the processor 802 is coupled through the bus 806 to the GPU 808. The GPU 808 performs any number of graphics functions and actions within the computing system 800, such as rendering or manipulating graphics images, graphics frames, videos, or the like, to be displayed to a user of the computing system 800. As described above with reference to FIG. 1, the desktop composition module in some embodiments may be implemented as part of the graphics driver GD of the computer system 800, and this graphics driver controls programming and operation of the GPU 808.

An image capture device 810, such as a camera, scanner, infrared sensor, or other type of suitable device, is also coupled to the bus 806 to communicate with the processor 802 and memory device 804. The processor 802 is coupled through the bus 806 to one or more displays 812, which may include displays that are internal to or "built-in" component of the computing system 800. The displays 812 may also include display screens that are external to the computing system 800. Examples of such a computing system 800 include mobile computing systems, such as cell or smart phones, tablets, 2-in-1 computers, notebook computers and the like. The display devices 812 may include a computer monitor, television, or projector, among others, that is externally connected to the computing system 800. In some examples of the computing system 800, the display devices 812 may be head-mounted display devices having a display capacity via projection, digital display, filtering incoming light, and the like.

The processor 802 is also be connected through the bus 806 to an input/output (I/O) interface 814 configured to connect the computing system 800 to one or more I/O devices 816. The I/O devices 816 may include, for example, a keyboard, a pointing device such as a touchpad or a touchscreen, a storage device, and other types of electronic devices. The I/O devices 816 may include built-in components of the computing system 800 or may be devices that are externally connected to the computing system. In some cases, the I/O devices 816 are touchscreen devices integrated within a display device, such as one or more of the display devices 812.

The computing system 800 may also include another storage device or devices 818, which may include a physical memory such as a hard drive, an optical drive, a thumb drive, an array of drives, or any combinations thereof. The storage device 818 may also include remote storage drives. A network interface controller (NIC) 820 connects the computing system 800 to a network 822, which may be a wide area network (WAN), local area network (LAN), the Internet, or the like. The computing system 800 is powered through a power supply unit (PSU) 824 that communicates with the processor 802 through the bus 806 to communicate control signals or status signals to the PSU. The PSU 824 includes a rechargeable power source such as a battery in some embodiments, and is coupled to a power source 826 external the computing system 800 to receive electrical power, charge the rechargeable power source when present, and to supply provide electrical power to the other components in the computing system 800. The block diagram of FIG. 8 is not intended to indicate that the computing system 800 must include all the components shown. Furthermore, the computing system 800 may include any number of additional components not shown in FIG. 8 based on the specific implementation or utilization of the computing system.

Embodiments Using Software Implementation with Mask Layer

Figure 9:
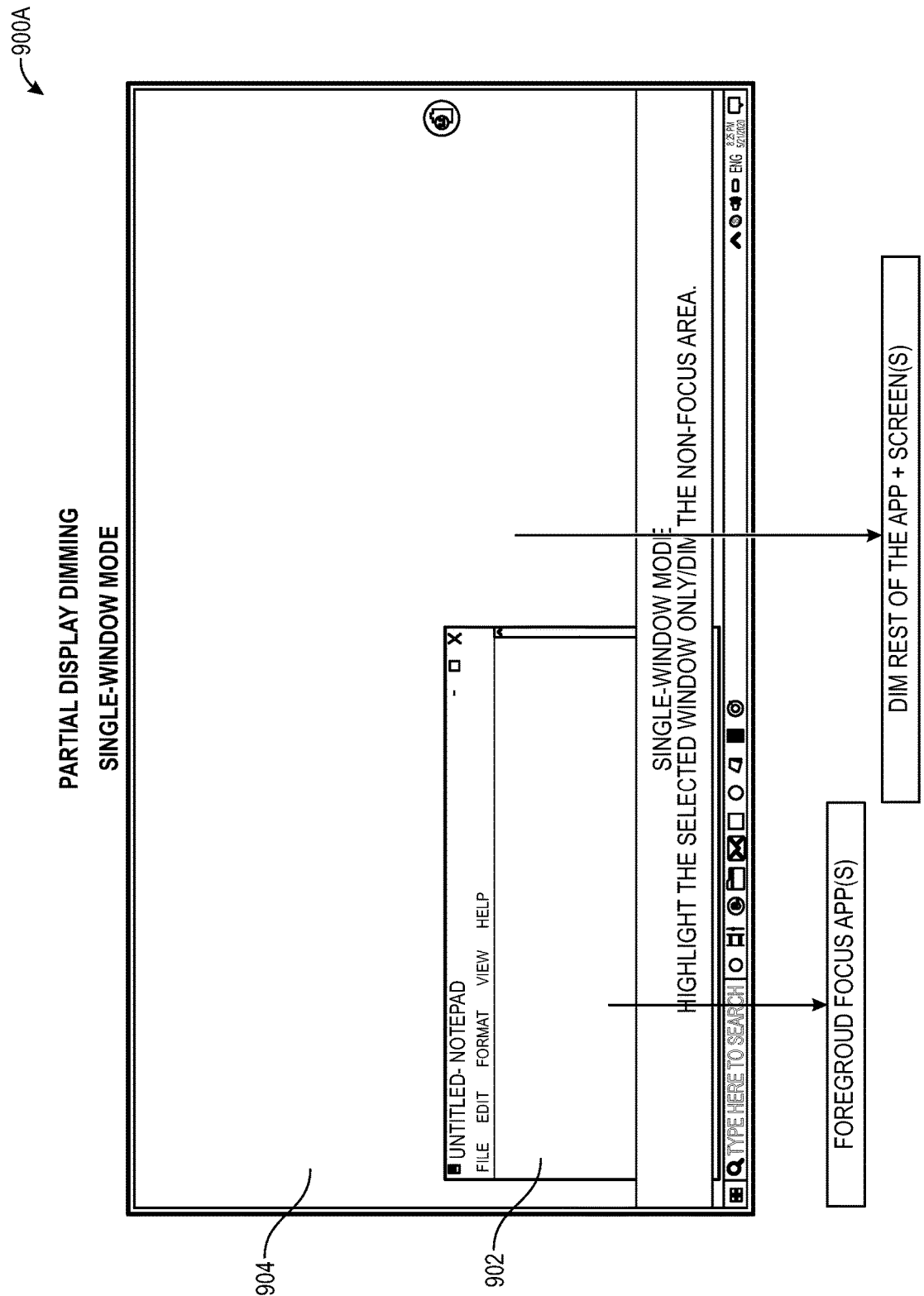
FIG. 9 shows example displays implementing partial display dimming in a single-window mode and a multi-window mode, in accordance with various embodiments.
Figure 9:
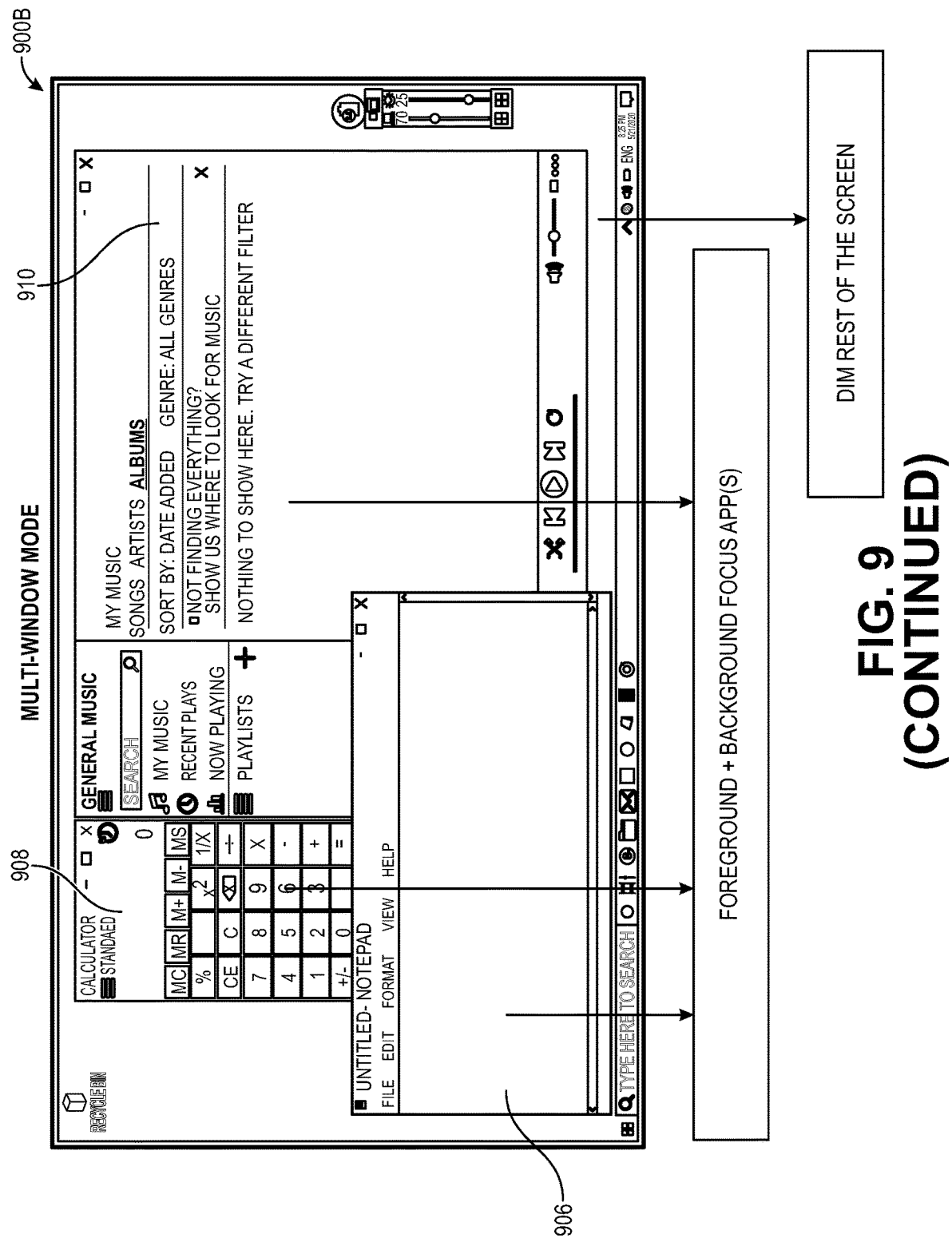

FIG. 9 shows example displays implementing partial display dimming in a single-window mode and a multi-window mode, in accordance with various embodiments. Display 900a shows an example of a single-window mode on the computing display. In embodiments, the computing display may be a display controlled by the Microsoft Windows™ operating system. An active window 902, which also may be referred to as a focus window having a foreground focus, is viewable on the display 900a. In embodiments, the active window 902 is not dimmed.

The portions of display 900a outside of the active window 902 are dimmed by applying a mask layer 904. The mask layer 904 may have varying levels of transparency associated with each pixel underneath the mask layer 904. This may result in dimming the portions of the display 904 ranging from slightly dimmed to completely opaque. This may be desirable when a user may not want to have other people view any applications or other data underneath the mask layer 904, and just expose the active window 902. In embodiments, a user may wish to dim non-focus areas that the user does not want to pay attention to.

In other embodiments, a user may be traveling or may not have any means to charge the device with the display and the user may want to reduce the battery drain by darkening the area of the display underneath the mask 904. For OLED displays, masked pixels with less intensity would use less power, thus power consumption for non-focus dimmed area is reduced. And because the total display power reduction is proportional to the size of the dimmed area, in embodiments up to 45-60% panel backlight power may be saved using this approach. Additional, this may help extend the battery life for computing devices with displays.

Display 900*b* shows an example of a multi-window mode on a computing display. Here, windows 906, 908, 910 may be focus areas that are not to be dimmed, with the remainder of the display 900*b* to be dimmed by a mask layer. This may be useful for users wanting to work on multiple windows simultaneously. Here, the user can select multiple windows as preferred. In embodiments, the system will keep all these windows in focus and dim the rest of the areas on screen. Outside the windows 906, 908, 910, a mask layer may be applied to dim or completely obscure other areas of the display 900*b*.

In embodiments, the mask layer may be an input mask later with different transparency levels (e.g. alpha of each pixel) with a combination of identifying region(s) to go under the masked layer for dimming, and region(s) to go above the masked layer for full visibility to the graphics composition system. The composition system and the underling graphics system of the computing device does not need to be changed. This is described further below.

Figure 10:
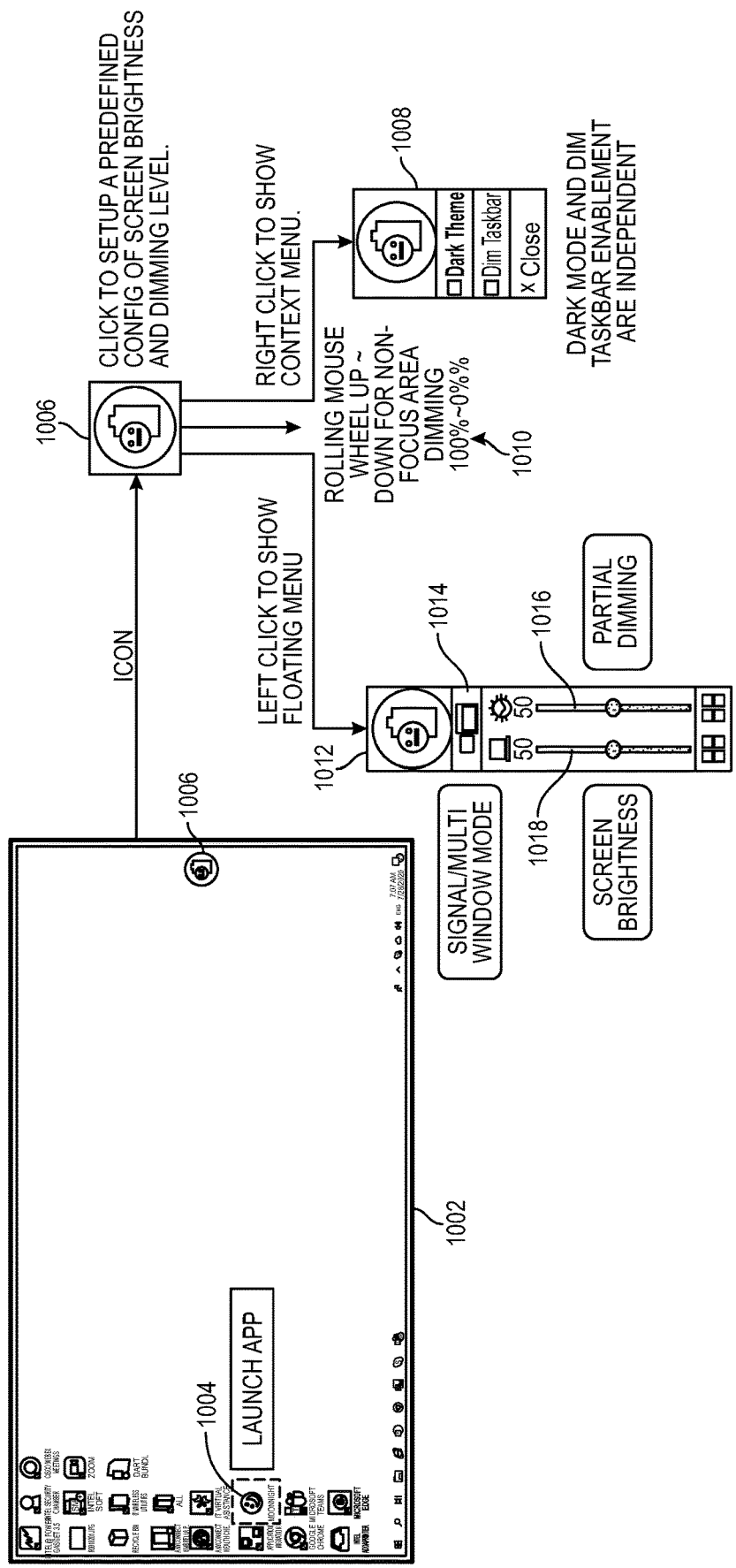
FIG. 10 shows example displays that include user interface features to control the areas to be dimmed and areas to be masked, in accordance with various embodiments.

FIG. 10 shows example displays that include user interface features to control the areas to be dimmed and areas to be masked, in accordance with various embodiments. Display 1002 may be similar to display 900*a* or 900*b* of FIG. 9, showing a Microsoft Windows™ desktop. An icon 1004 may be used to launch an application that has a focus window, such as focus window 902 of FIG. 9. The desktop 1002 may also include another icon 1006 that, when selected by a user, allows the user to provide input to the partial dimming system to control various aspects of how a mask layer is applied and is modified based upon the users interaction with the display 1002.

For example, if a user right clicks on the icon 1006, a context menu 1008 may appear that allows the user to select various mask layer themes such as a "dark mode," or specific areas such as a taskbar, to which a mask and dimming features of the mask are to be applied.

In another example, rolling wheel on a mouse device used to display 1002, may have various functions from which to select. For example, rolling the mouse wheel up or down to change the level of dimming applied to non-focus areas, from no dimming to completely opaque.

In another example, clicking on the icon 1006 may allow the user to select single or multi-window mode using icon 1014, as discussed with respect to displays 900*a*, 900*b* of FIG. 9. In addition, screen brightness 1018 and partial dimming 1016 may also be adjusted by the user. The example shown in FIG. 10 are non-limiting embodiments of a partial example of customizations that may be made by a user. These customizations, or other customizations not shown herein, may be identified and input to the partial dimming system using other techniques.

Figure 11:
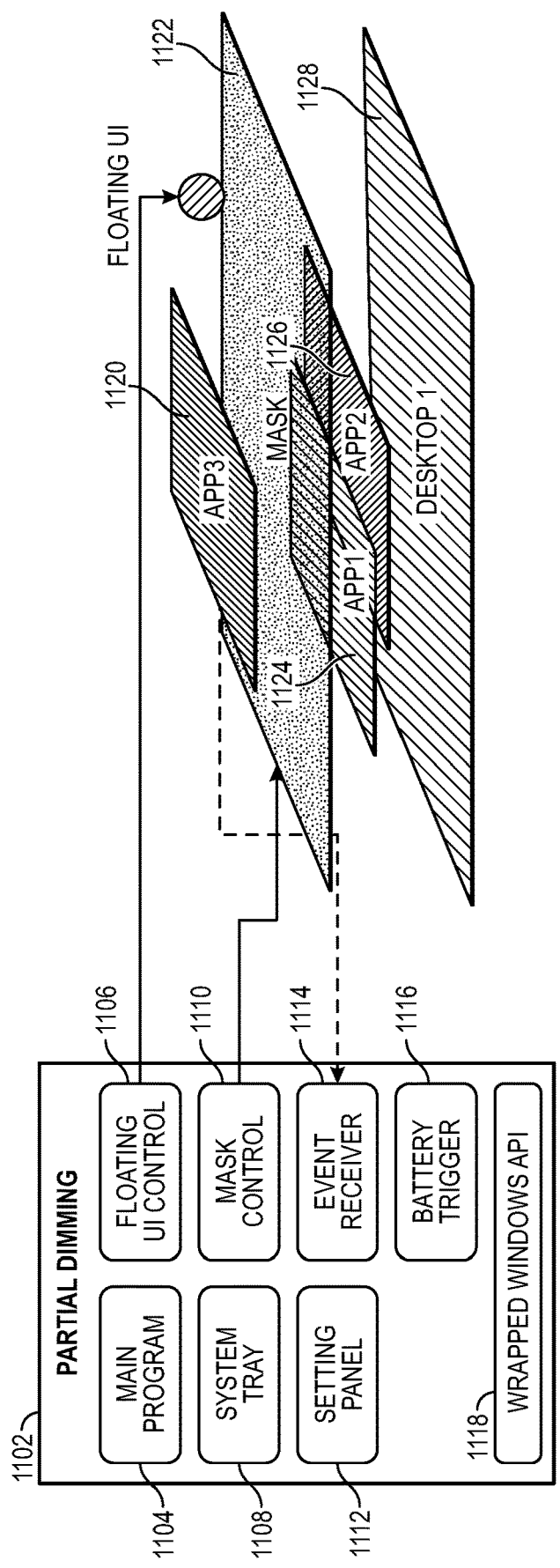
FIG. 11 shows an example of a software architecture to implement a mask over multiple application windows that appear on a desktop, in accordance with various embodiments.

FIG. 11 shows an example of a software architecture to implement a mask over multiple application windows that appear on a desktop, in accordance with various embodiments. The diagram in FIG. 11 describes an embodiment of a partial dimming system 1102 with various components. These components may include a main program 1104 with which the partial dimming system 1102 may interact, along with the system tray 1108 which may be independently dimmable, and a setting panel 112, which may be similar to functionality described above with respect to icon 1006 of FIG. 10.

A floating user interface control 1106 may be used to identify where the level of various applications 1120, 1124, 1126 are in relation to the desktop 1128 and the mask 1122. A mask control 1110 may be used to modify the dimensions, the shape, and various transparency levels of pixels onto which the mask 1122 is applied. Mask control 1110 may also be used to either instantiate the mask 1122 or to remove the mask 1122.

The event receiver 1114 may be used to identify the application, such as application of 1120, that currently receives focus. This information may be used by the partial dimming system 1102 to modify the configuration of the mask 1122 in order to allow the application with focus, such as application 1120, to not be dimmed. The battery trigger 1116 may be used to identify a battery charge level, and provide this input to the partial dimming system 1102 in order to automatically implement the mask 1122 in order to save battery power by applying a mask to dim non-focus areas on the desktop 1128.

It should be noted that the application of the mask 1122 given the various levels of the applications 1120, 1124, 1126 are used to dim portions of the desktop 1128 that otherwise would display at full brightness. Because the partial dimming system operates above the hardware level, lower levels of the computing system may be unaware of the mask 1122 or application layers.

Figure 12:
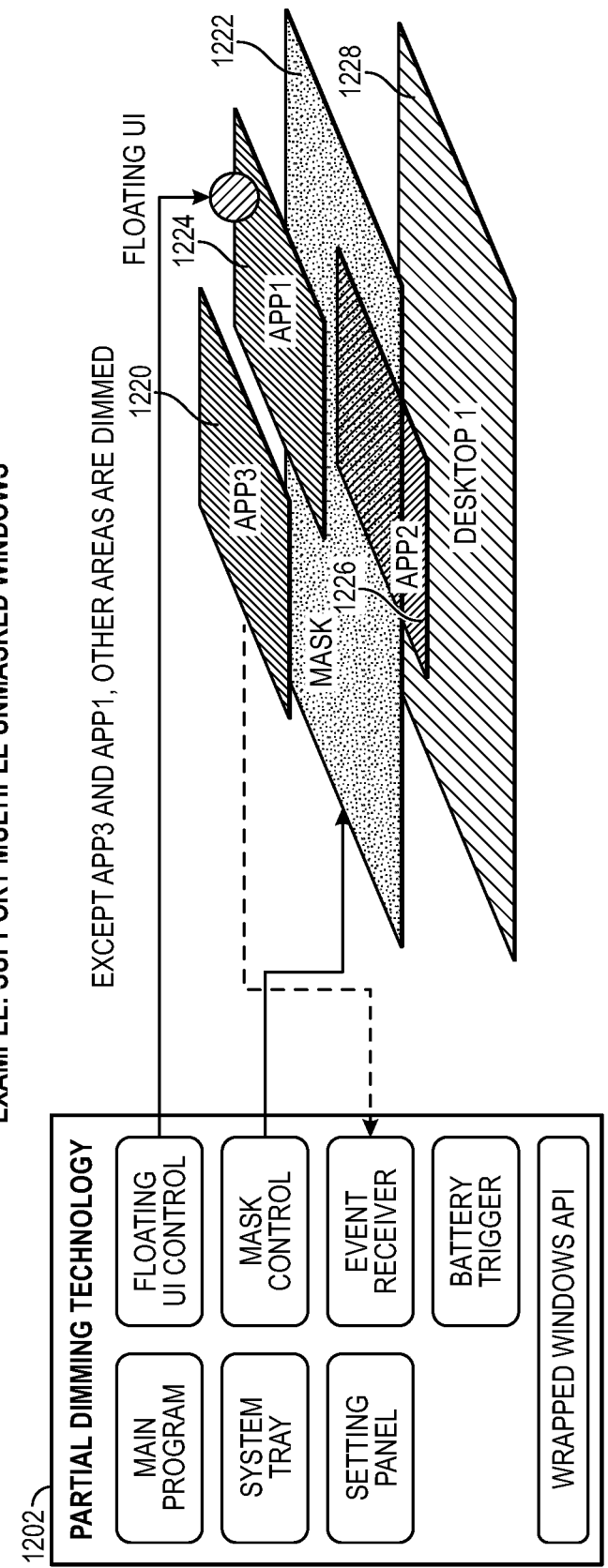
FIG. 12 shows an example of multiple unmasked windows, in accordance with various embodiments.

FIG. 12 shows an example of multiple unmasked windows, in accordance with various embodiments. Whereas FIG. 11 dealt with a single application 1120 being the focus area that is undimmed, FIG. 12 shows an example of two applications 1220, 1224 that are focus areas and are undimmed. As shown, the partial dimming system 1202, which may be similar to the partial dimming system 1102 of FIG. 11, shows two applications 1220, 1224 that are above the mask layer 1222, and as a result are not dimmed. As shown, a third application 1226 that is at a layer between the mask layer 1222 and the desktop 1228, will be dimmed by the mask 1222.

Figure 13:
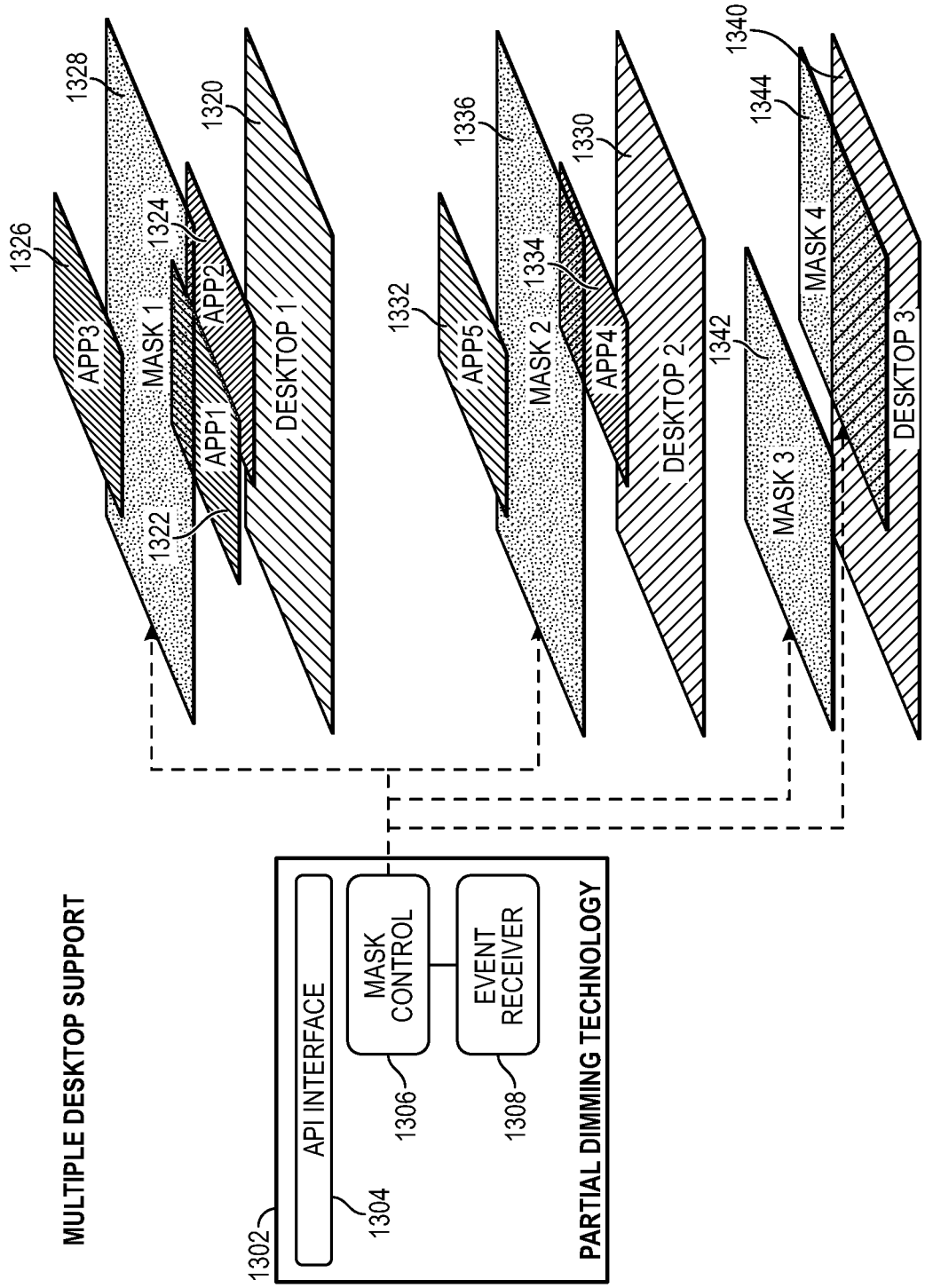
FIG. 13 shows an example of multiple desktops with masks and applications, in accordance with various embodiments.

FIG. 13 shows an example of multiple desktops with masks and applications, in accordance with various embodiments. Three different desktops represented by desktop 1 1320, desktop 2 1330, and desktop 3 1340 may be desktops displayed on different display devices (not shown). These different display devices may be part of a folding display, a laptop with multiple displays, or another computing device that may be driving multiple displays as described in more detail below. The partial dimming system 1302 may be similar to partial dimming system 1202 of FIG. 12 or partial dimming system 1102 of FIG. 11.

As shown, the partial dimming system 1302 may include an application programming interface (API) 1304 that is able to coordinate, in conjunction with mask control 1306 and the event receiver 1308, the dimensions and properties of the various masks 1328, 1336, 1342, 1344 across the various displays. Desktop 1320 may include an application 1326 that is a focus area that is in a layer above the mask layer 1328. Applications 1322, 1324 are in layers below the mask layer 1328, and therefore these applications are dimmed. In addition, any graphics on the desktop 1320 that are covered by the mask layer 1328 will also be dimmed.

The second display may include an application 1332 that is a focus area and above the mask layer 336 such that the application window 1332 will be undimmed. The application 1334 below the mask layer 1336 will be dimmed, as well as any graphics displayed on the desktop 1330 that are covered by the mask 1336. The third display is an example of multiple masks. Here, multiple masks 1342, 1344 may be applied over desktop 3 1340 to provide partial dimming of the desktop 1340.

Figure 14:
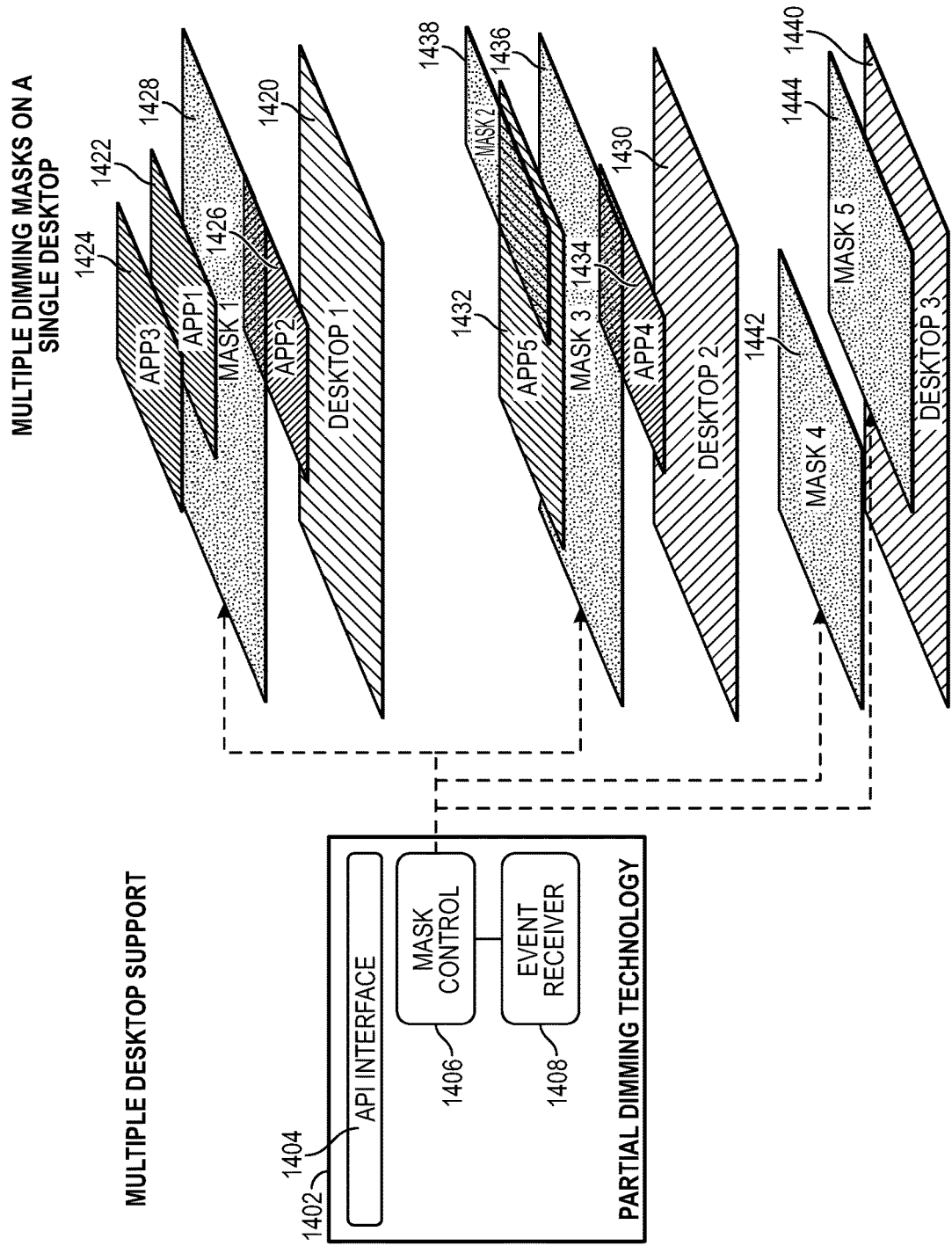
FIG. 14 shows another example of multiple desktops with masks and applications, in accordance with various embodiments.

FIG. 14 shows another example of multiple desktops with masks and applications, in accordance with various embodiments. Similar to FIG. 13, three different desktops represented by desktop 114 20, desktop 2 1430, and desktop 314 40 may be desktops displayed on different display devices (not shown) the partial dimming system 1402 may be similar to the partial dimming system 1302 of FIG. 13.

As shown, applications 1424, 1422 may both be focus areas that appear in layers above mask layer 1428. Application 1426, that is non-focus area that appears in a lower layer, will be dimmed by the mask 1428 along with non-focused areas of desktop 1420.

Regarding desktop 2 1430, the top layer includes a mask 1438 that is above a focus application 1432. Here, only the portions of application 1432 that are covered by mask 214 38 will be dimmed. Mask 314 36 will completely dim application 1434, as well as corresponding areas of desktop 214 30. Here, the mask control 1406 is using a same mask 1428, 1436 that are applied both to desktop 1 1420 of the first display and desktop 2 1430 of the second display. In embodiments, the masks described with respect to FIG. 13 and FIG. 14 are not necessarily limited to Windows-based areas, but rather could be any interested area of any shape.

Figure 15A:
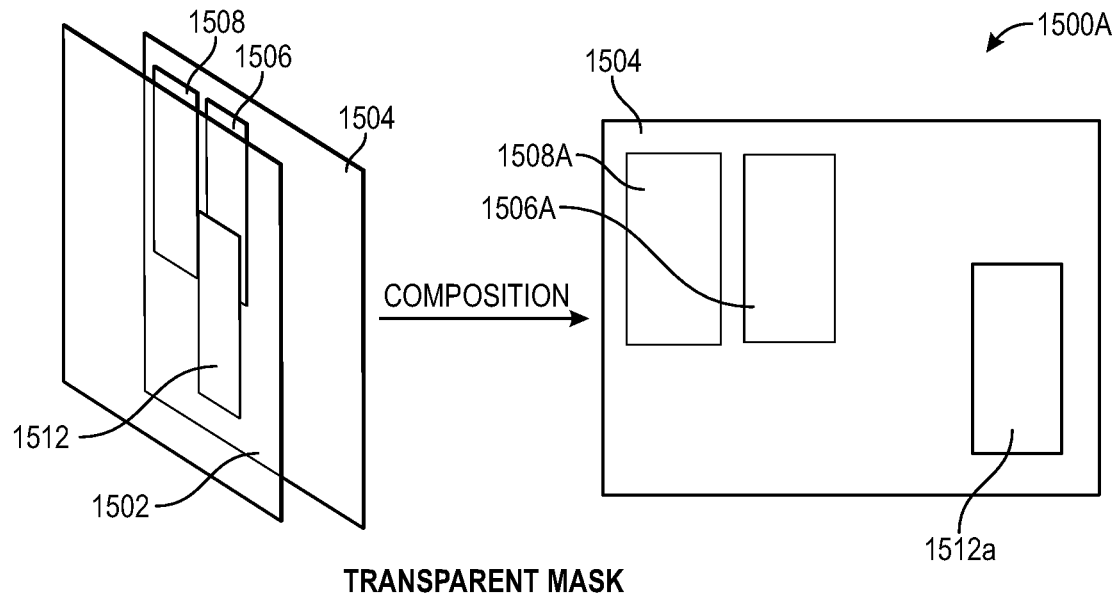
FIGS. 15A and 15B show two examples of a display with various levels of shading of dimming on the display by implementing a mask, in accordance with embodiments.
Figure 15B:
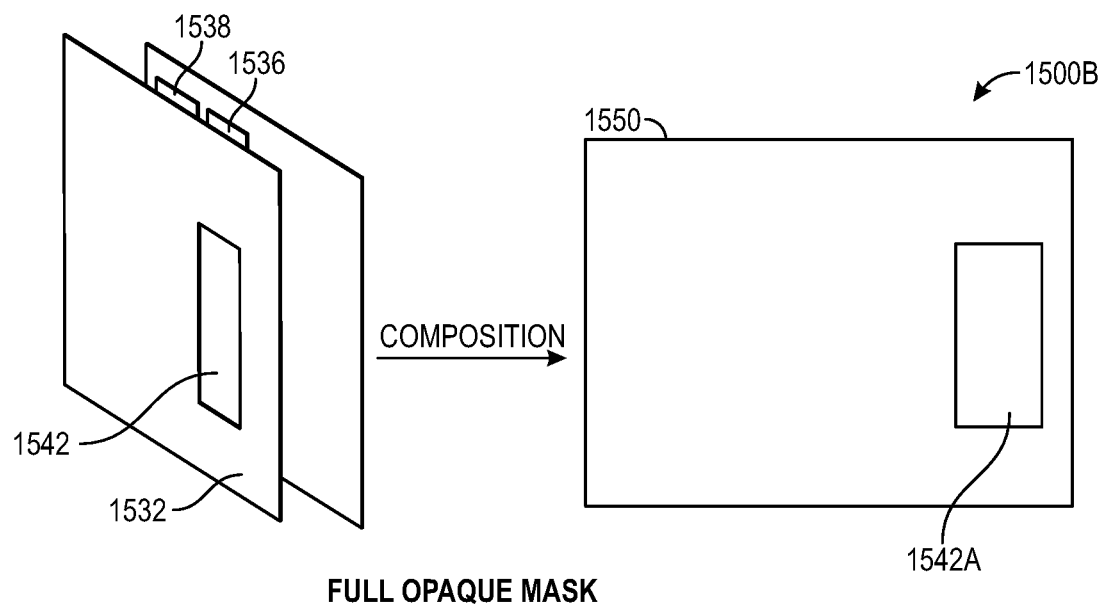

FIGS. 15A and 15B show two examples of a display with various levels of shading or dimming on the display by implementing a mask, in accordance with embodiments. Diagram 1500a shows an example of a input mask layer 1502 that is applied (or added) over a display image 1504. The transparent mask 1502 includes an area 1512 that is not masked. The display image 1504 may be example of a Windows user interface, with areas 1506, 1508 that show windows controlled by two different applications.

The display image 1504 is dimmed by adding an input mask layer 1502 with different transparency levels with a combination of identifying region(s), such as areas 1506, 1508, to go under the mask layer for dimming, and region(s), such as area 1512, to go above the mask layer for full visibility to the graphics composition system. The blended result is shown in composition 1520 with areas 1506a, 1508a dimmed but still accessible by the user, for example if the user were to mouse click in the areas, and an area 1512a undimmed. In other embodiments, the areas 1506a, 1508a may not be available to the user, for example if the user were to mouse click in those areas. In embodiments, an undimmed area may be referred to as a focus area. The composition system and the underling graphics system of the computer system and the display do not need any changes.

Modifying the final composited desktop surface is way to dim the display. Mathematically, applying a mask works as the dim function below. However, there is an alternative algorithm based on the blend formula:

$$\text{dim(pixel)} = \text{pixel} * \alpha = \text{blend}(0, \text{pixel}, 1-\alpha) \text{ while blend}(a,b,x\alpha) = a*x\alpha + b*(1-x\alpha)$$

Pixel blending is a common graphics operations in modern graphics systems. By adding a mask layer 1502 as input with alpha ($\alpha$) transparency, any level of dimming effect may be achieved at final composition stage 1520. Note: in embodiments, the different transparency levels may be represented by the alpha ($\alpha$) of each pixel, and the alpha value of different pixels could be different.

Diagram 1500b shows an example of an opaque mask 1532, with cut out area 1542. In embodiments, if the mask layer 1532 is fully opaque, then all layers below it 1536, 1538 do not need second time rendering. Thus, not only the content of masked area is invisible, but the actual rendering operation could be skipped. As a result, in embodiments, adding an input mask layer may bring extra graphics computation power saving which cannot be achieved in the final composition stage 1550. In this example, only the area 1542a would need to be rendered and updated. Other areas only need one time rendering, and no update is needed because it is kept as a darker color or black.

These and other embodiments allow many ways to define undimmed and dimmed regions by user inputs or software preset. The undimmed regions such as an Active Application Window(s), predefined fixed or moving areas on display will be defined as voids of mask layer to allow full visibility, and the rest of the areas to be dimmed, either partially or completely. And the input determination from the user may include touch devices, mouse, keyboard, voice control, eye tracking, system power policies, etc. as described with respect to FIG. 1.

In contrast to the output stage dimming, as described with respect to FIGS. 1-8, tracks the focus area and/or dimmed area. This partial panel screen dimming, which may also be referred to as input stage dimming, does not need to maintain this information (focus region and/or dimmed region) explicitly. The defined dimmed region(s) under the mask layer are automatically dimmed, the defined undimmed region(s) above the mask layer are automatically undimmed. And furthermore, the depth (layer) of the windows are managed by existing algorithms built-in the OS. For example, the dimming area selection can be achieved by normal application window activation and deactivation. Because embodiments may only define a mask and voids to separate the undimmed and dimmed areas, not capturing any display content may lessen concerns for privacy protection. In addition, on systems that output buffer is protected, output stage dimming may not be easily achieved, unless low level driver or hardware changes involved.

In embodiments, implementation of partial panel screen dimming work on the application level. User interactions within dimmed display area can naturally be received and further processed. In contrast with output stage dimming, neither low level graphics driver nor desktop composition module would take care of this interactions.

With respect to FIG. 15, embodiments that implement partial panel screen dimming include two primary functionalities. First, to define an input mask layer and manage its transparency and depth. Second, to monitor and manage user interactions within the dimming area. The input mask can be within a single layer or distributed to multiple layers. The shape of the mask can be arbitrary, e.g. it does not need to be a square area.

Figure 16A:
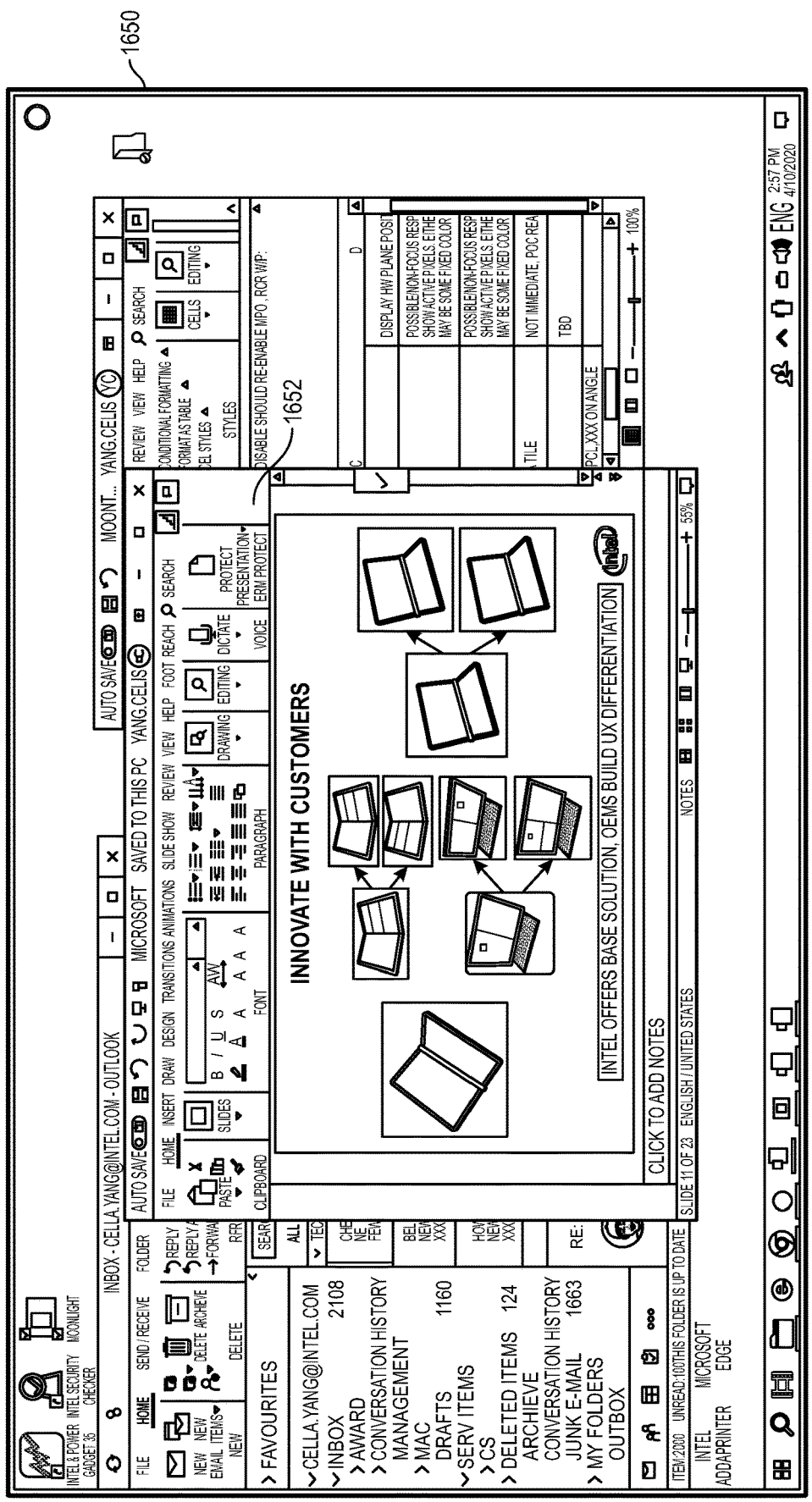
FIGS. 16A, 16B, and 16C show an example of a mask applied to dim areas of the display, with various levels of user interaction based on the transparency of the mask, in accordance with embodiments.
Figure 16B:
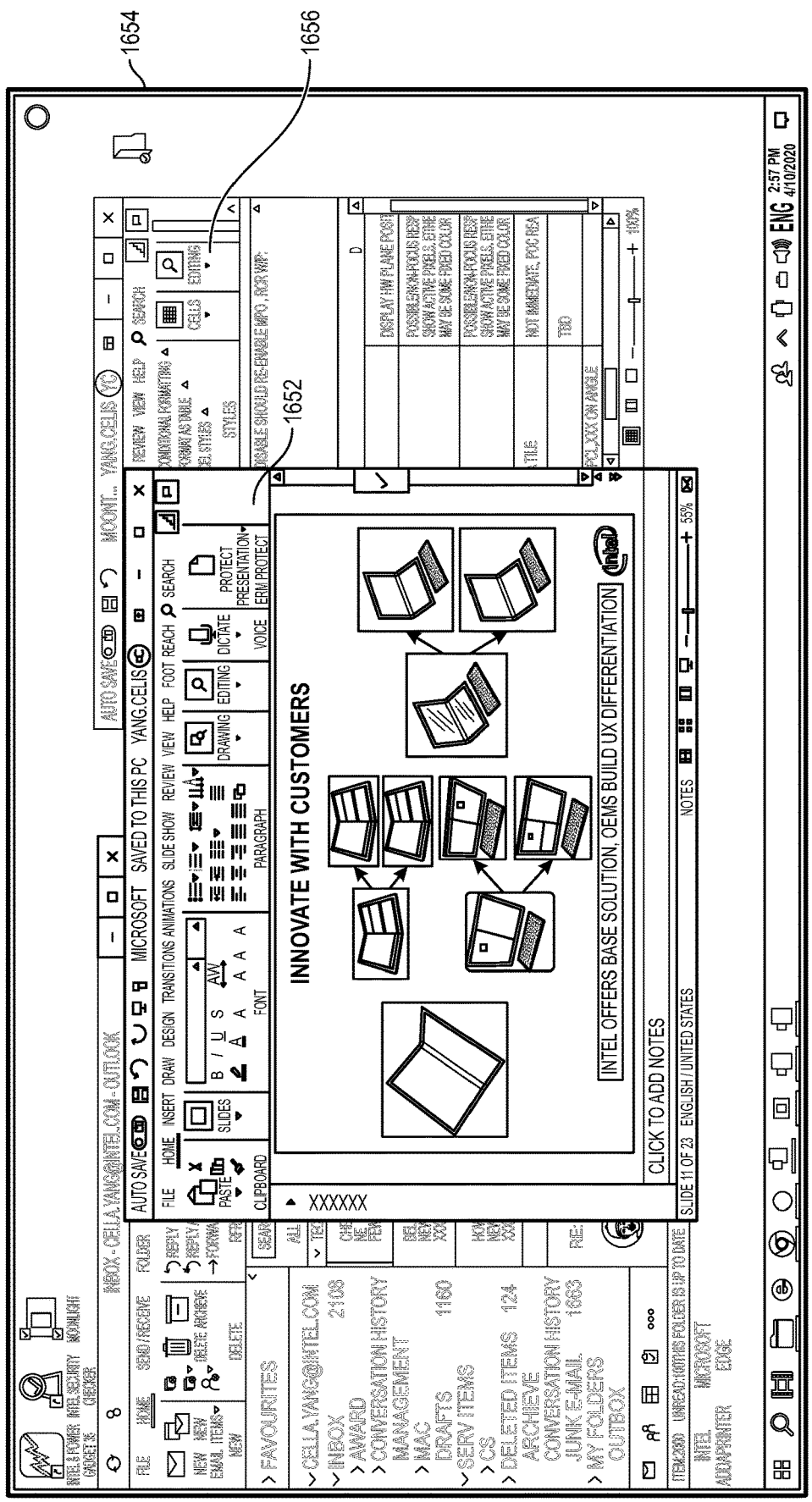
Figure 16C:
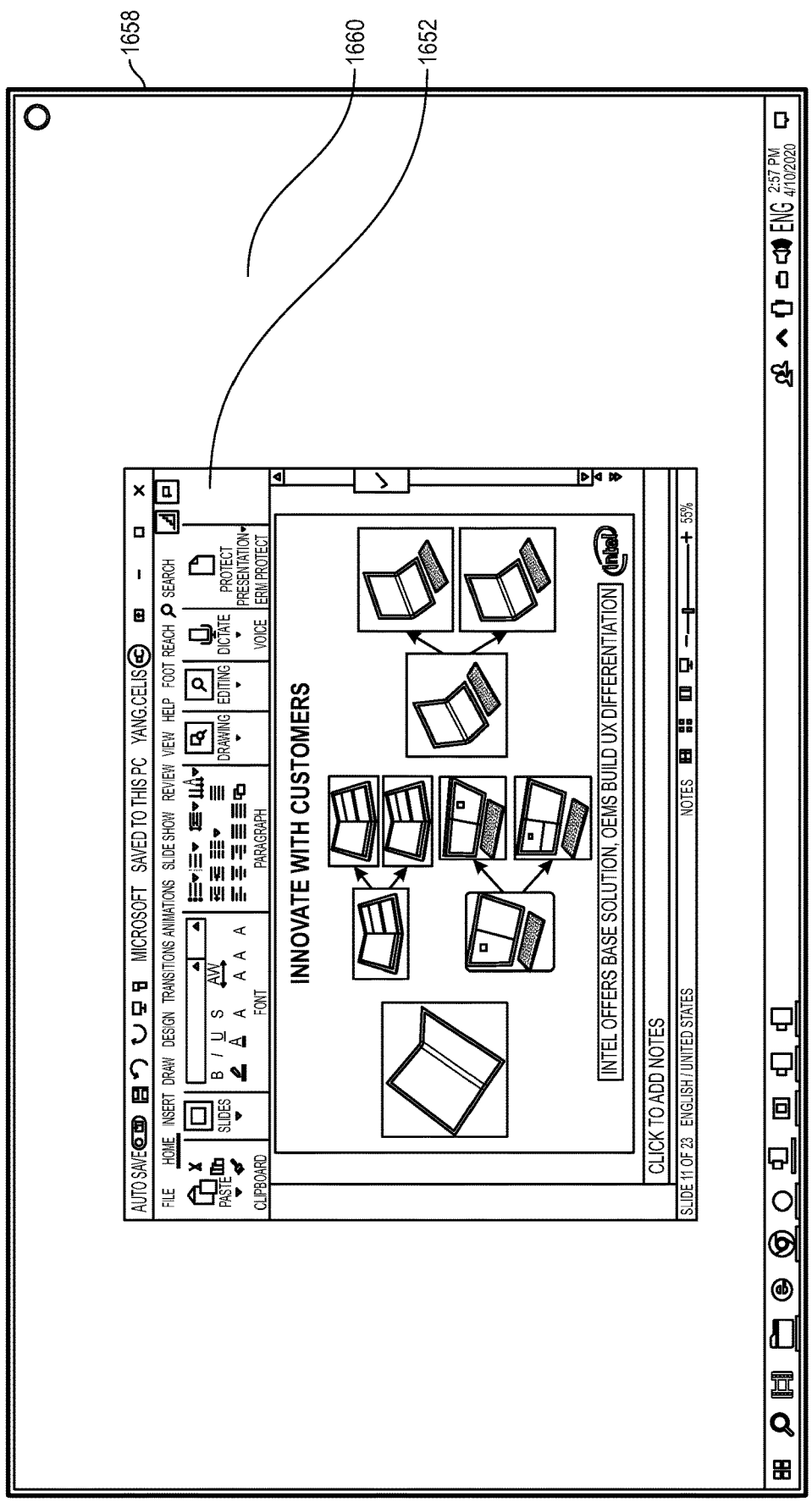

FIGS. 16A, 16B, and 16C show an example of a mask applied to dim areas of the display, with various levels of user interaction based on the transparency of the mask, in accordance with embodiments. User interface 1650 shows a computer screen with multiple applications running and includes an application window 1652 on top of the background application windows. User interface 1654 shows a computer screen similar to interface 1650, however a transparent mask 1656 has been applied, where the mask 1656 has an open area 1652 to allow the top application to be viewed without dimming. In embodiments, both the top application and background applications may be selected by a user, for example by using a keyboard or a mouse.

User interface 1658 shows a computer screen similar to interface 1650, however an opaque mask 1660 has been applied, where the mask 1660 has an open area 1652 to allow the top application to be viewed without dimming. In embodiments, only the top application is able to be viewed through the open area 1652, and may be selected and interacted with by a user.

Note that in embodiments, a region of the user interface 1650/1654/1658 may include areas, for example the upper right-hand corner, for a user to double-click to exit the application of the mask. In other embodiments, there may be features, such as an auto hide slider bar that may be used to adjust dimming of the non-focus areas.

Figure 17:
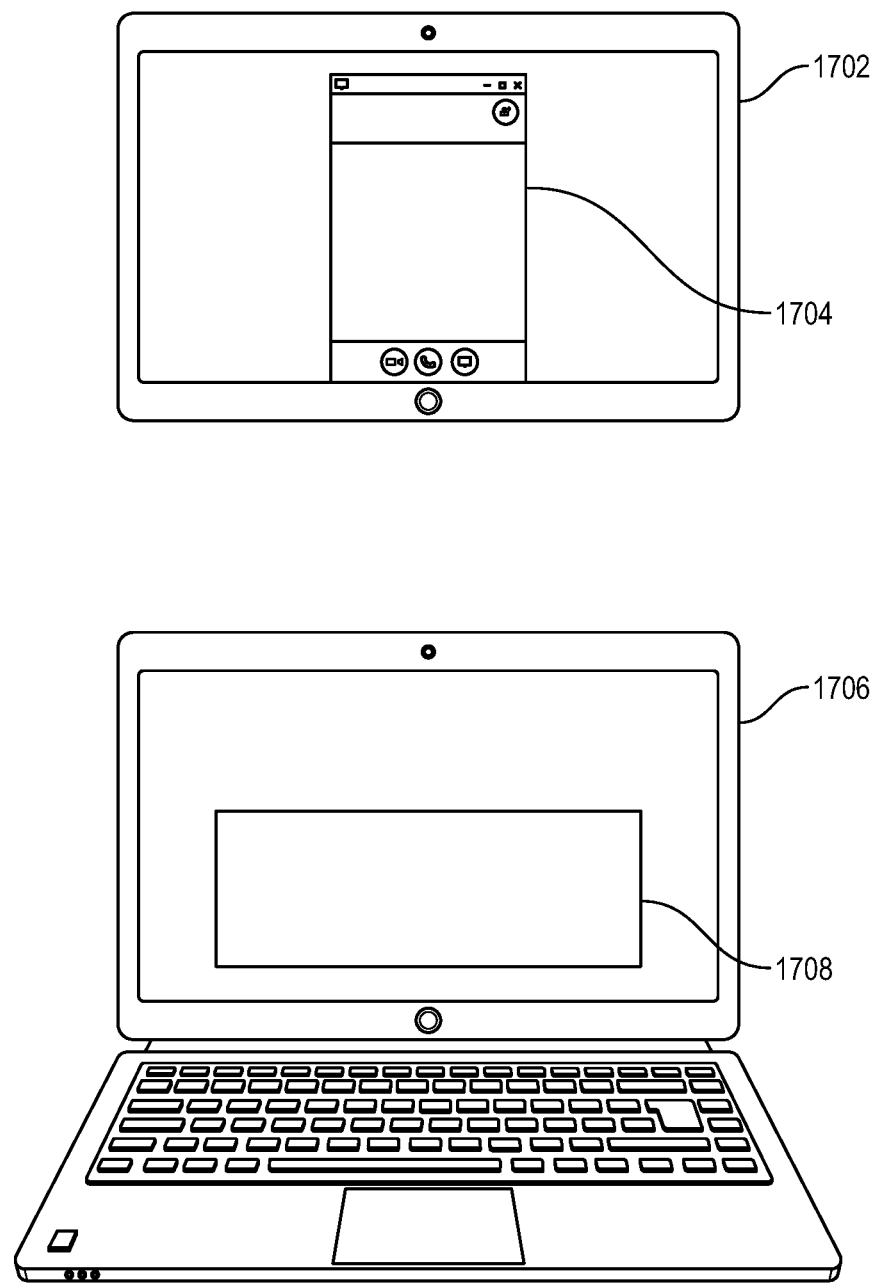
FIG. 17 shows various examples of masks applied to dim areas of the display, in accordance with embodiments.
Figure 17:
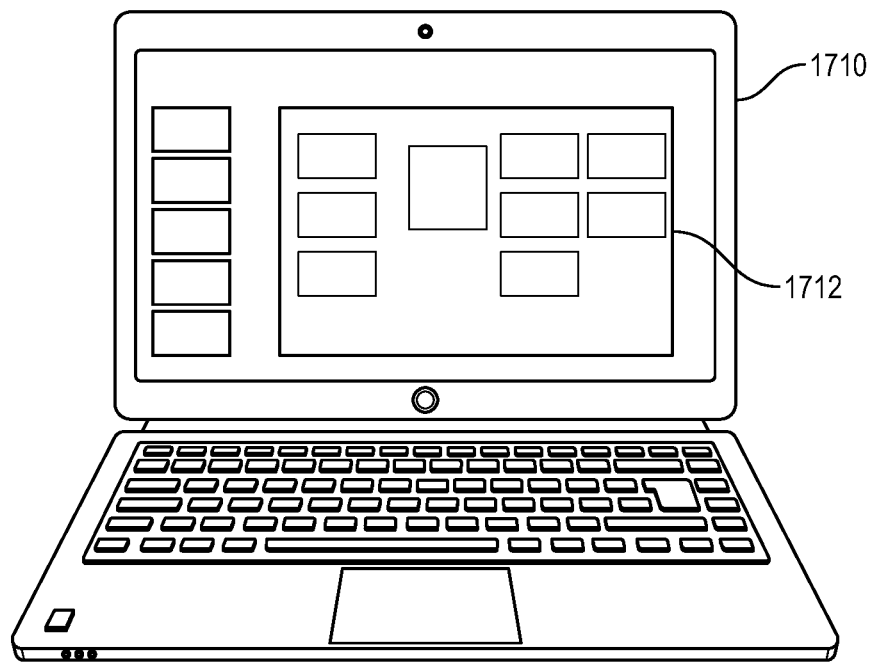
Figure 17:
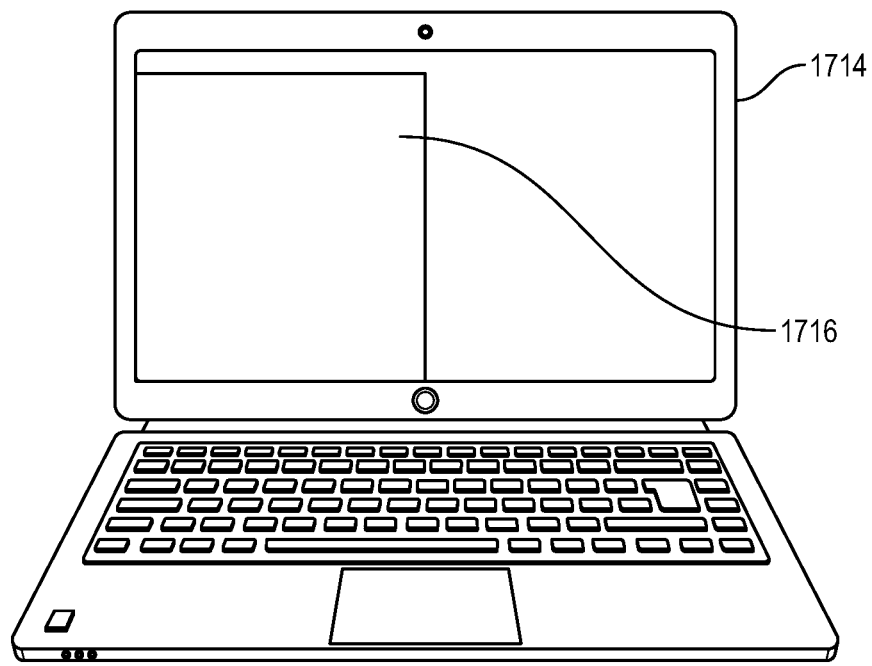

FIG. 17 shows various examples of masks applied to dim areas of the display, in accordance with embodiments. Screen 1702 shows a selected or active application 1704 as the focus display only, with the rest of the display dimmed. Screen 1706 shows a defined box area 1708 as the focus display only, with the rest of the display dimmed. Screen 1710 shows an application window 1712 partially dimmed, where the white/brighter areas are also dimmed. The application window icon bar, non-user interactive regions can be dimmed to darker color or black.

Screen 1714 shows a window 1716 where the window size has shrunk and is displayed only, with the other areas being dimmed. The shrunk display position can be anywhere on the panel.

Figure 18:
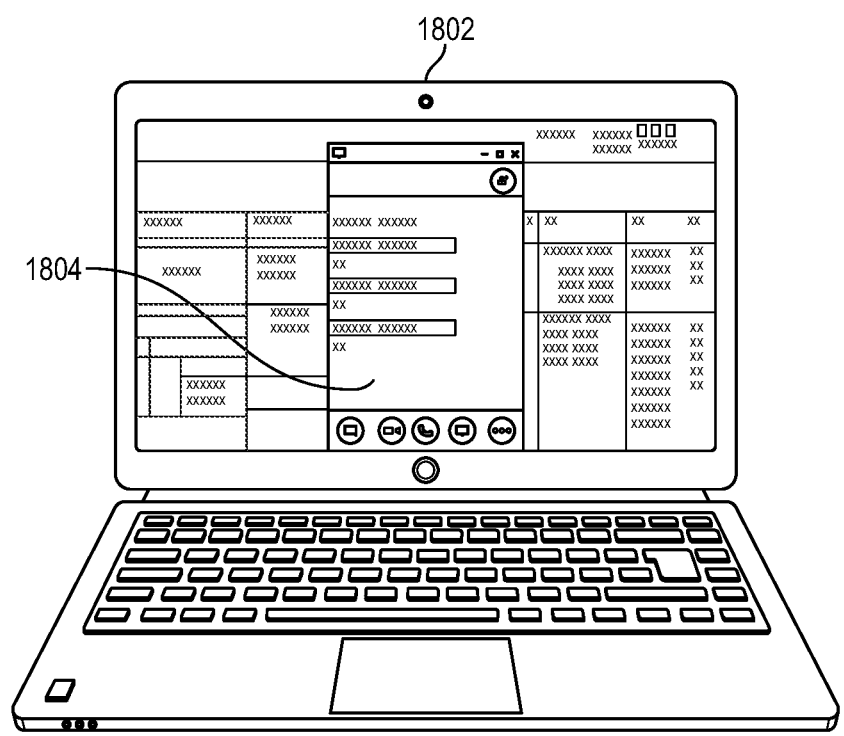
FIG. 18 shows examples of displays with masks having different levels of transparency to dim areas of the display, in accordance with embodiments.
Figure 18:
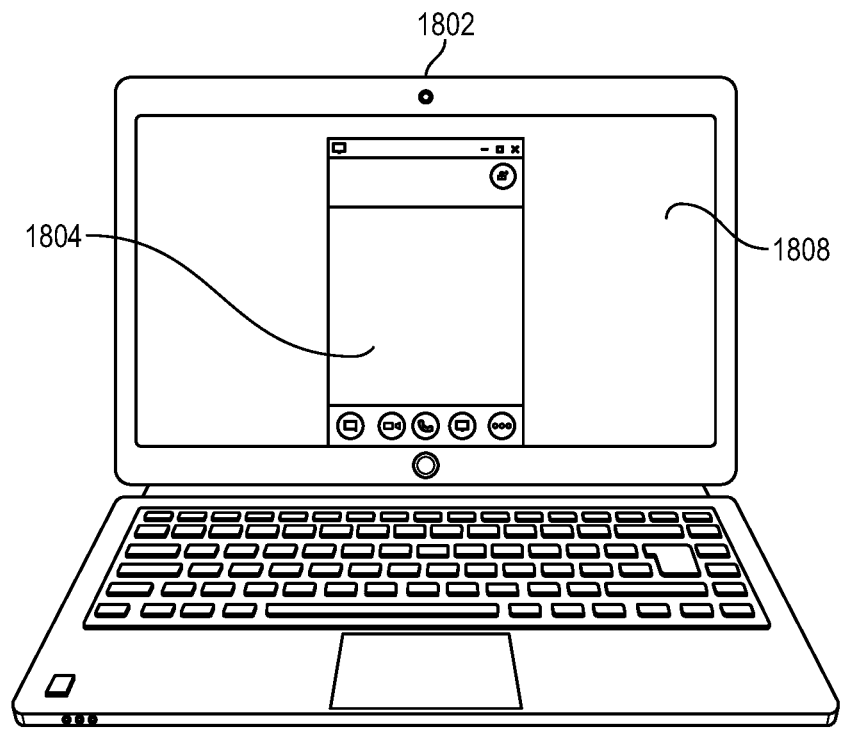
Figure 18:
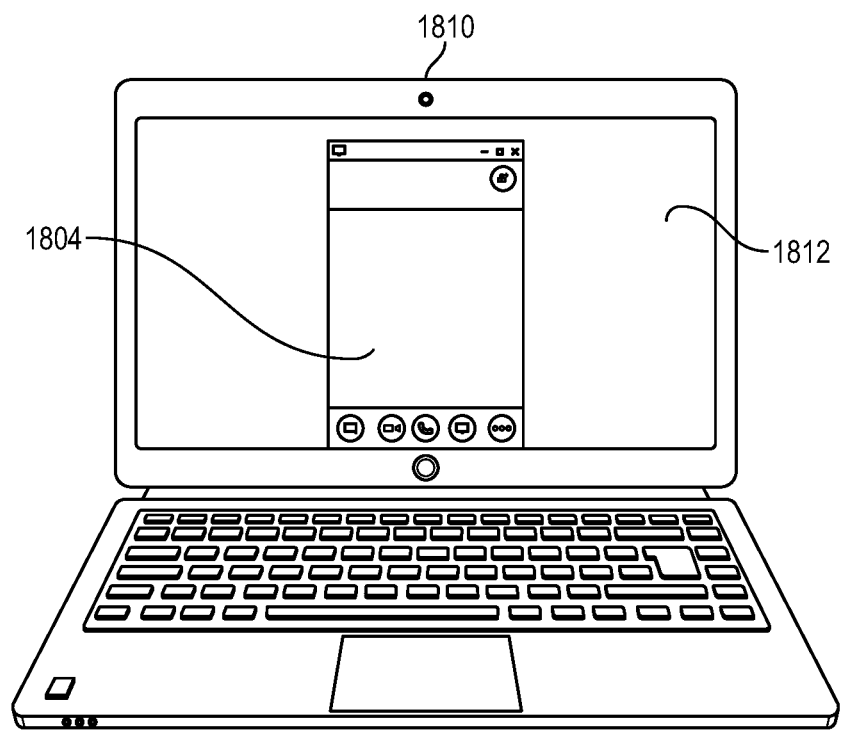

FIG. 18 shows examples of displays with masks having different levels of transparency to dim areas of the display, in accordance with embodiments. Screen 1802 is shown not dimmed, with application 1804 running in a top window. Screen 1806 shows a mask 1808 applied at 50% transparency, leaving application 1804 with focus and normal brightness. Screen 1810 shows a mask 1812 applied at 100% transparency, or opaque, leaving application 1804 with focus and normal brightness. The dimming areas can be one or multiple regions, and does not have to be on an application windows focus—it could be anywhere on the screen. For example, it can also be on the edges.

Figure 19:
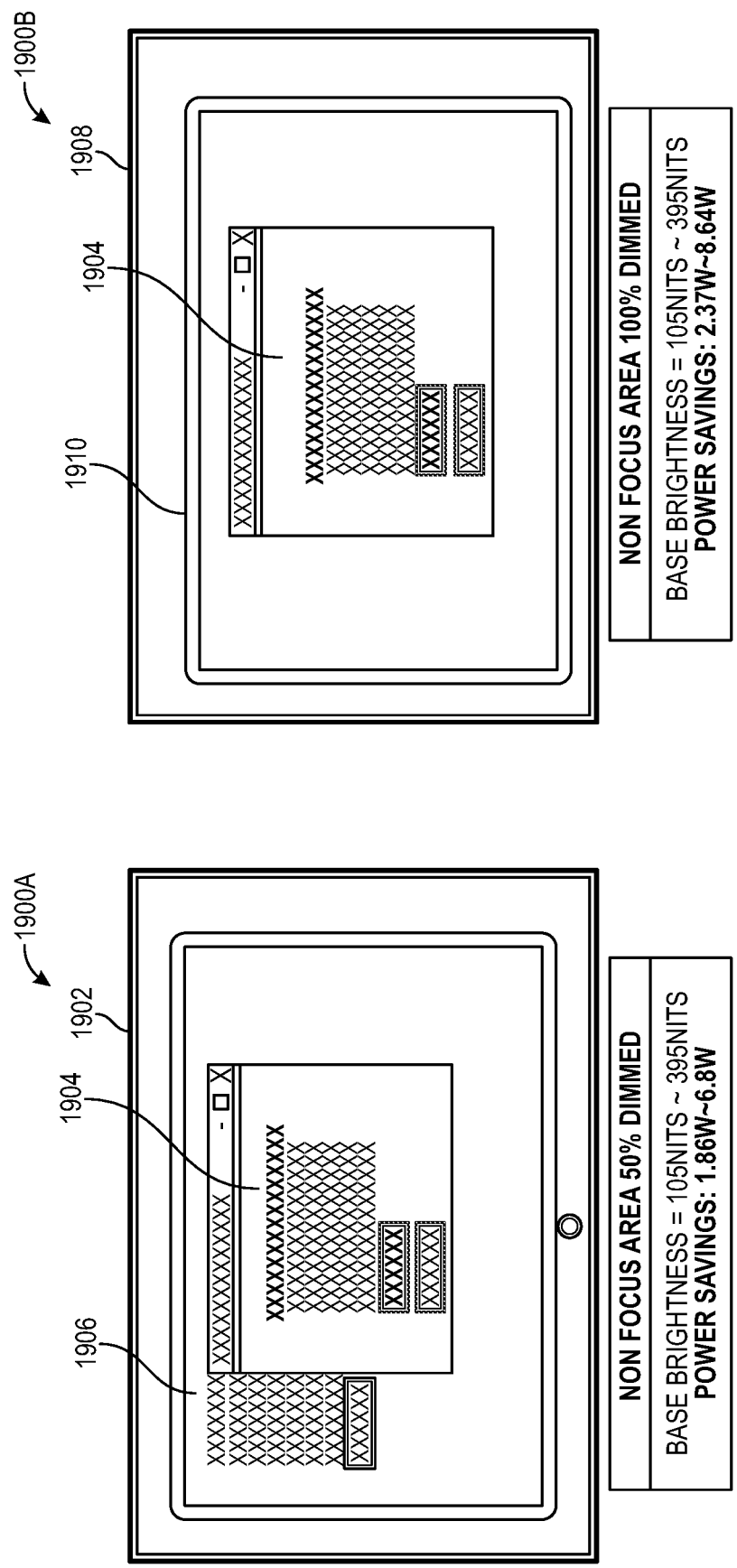
FIG. 19 shows an example of power savings expectations for non-focus areas that are partially or fully dimmed, in accordance with embodiments.

FIG. 19 shows an example of power savings expectations for non-focus areas that are partially or fully dimmed, in accordance with embodiments. Diagram 1900*a* shows a display 1902 that has an active area 1904 that is not dimmed, but where other non-focus areas 1906 on the display 1902 are dimmed at a 50% level, or where the mask is at a 50% transparency. In this example, the base brightness is between 105 nits to 395 nits, with the power savings of 1.86 watts (W) to 6.8 W. Diagram 1900*b* shows a display 1908 that has an active area 1904 that is not dimmed, but where other non-focus areas 1910 on the display 1908 are dimmed at 100% level. Where the mask is opaque. In this example, the base brightness is between 105 nits to 395 nits, with the power savings of 2.37 W to 8.64 W. This example included a test configuration of an OLED 4K 15.6" single display. The power savings included approximately 50% plus the backlight power savings of (1.86 W-8.64 W), and approximately 30% system battery life extension. A different panel may give different savings values.

With respect to expected or estimated power saving examples, the following may apply. When the partial dimming is applied in a browsing scenario where more than one internet explorer (IE) browser window is opened, the top most IE window is in focus while the rest of the screen is not in focus. The rest of the screen which is not in focus including the out-of-focus IE windows are dimmed.

Experimental analysis shows the comparison of the panel backlight power for a 15.6" 4K OLED panel which is set to 105 nits and 395 nits respectively for two sets of scenarios and the backlight power instrumented for power measurement. For each OLED panel brightness setting, three experiments were done. The first experiment does not apply partial dimming. The second experiment applies 100% dimming to the out-of-focus area. The third experiment applies 50% dimming to the out-of-focus area.

Results shows 100% dimming gives >50% panel backlight power savings and 50% dimming gives >40% panel backlight power savings on this OLED panel with an average >50% savings.

Figure 20:
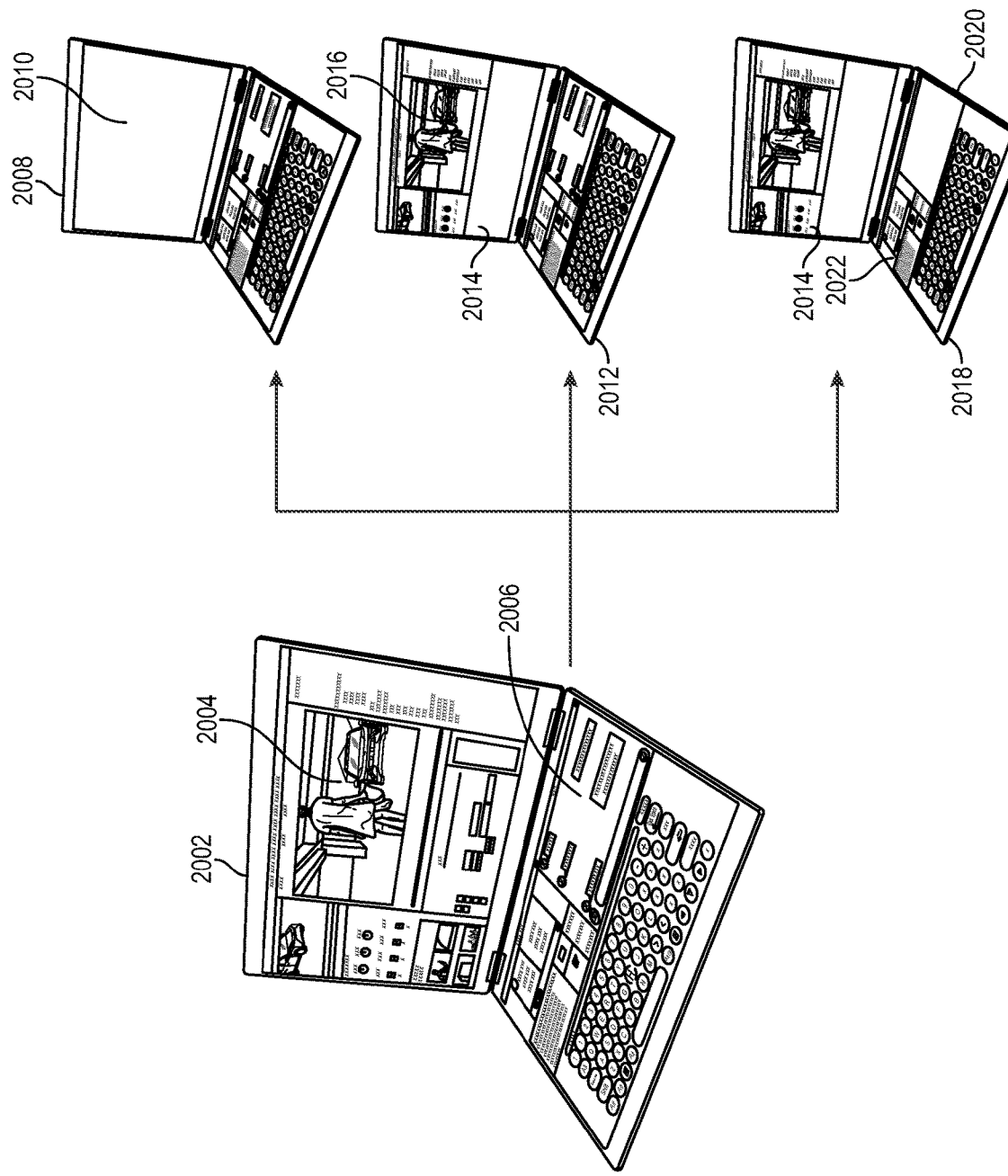
FIG. 20 shows an example of a computer with two displays where masks are used to dim areas of the two displays, in accordance with embodiments.

FIG. 20 shows an example of a computer with two displays where masks are used to dim areas of the two displays, in accordance with embodiments. Computer 2002 includes two displays, an upper display 2004 and a lower display 2006. Computer 2008 shows the upper display 2004 with a mask 2010 applied to completely dim the upper display 2004. Computer 2012 shows a mask 2014 applied to the upper display 2004 to dim the upper display 2004 except for application 2016. Computer 2018 shows a mask 2014 applied to the upper display 2004, and a second mask 2020 applied to the lower display 2006 to cause only the application in the window 2022 to be visible. The display remaining on can also be partially dimmed.

Figure 21:
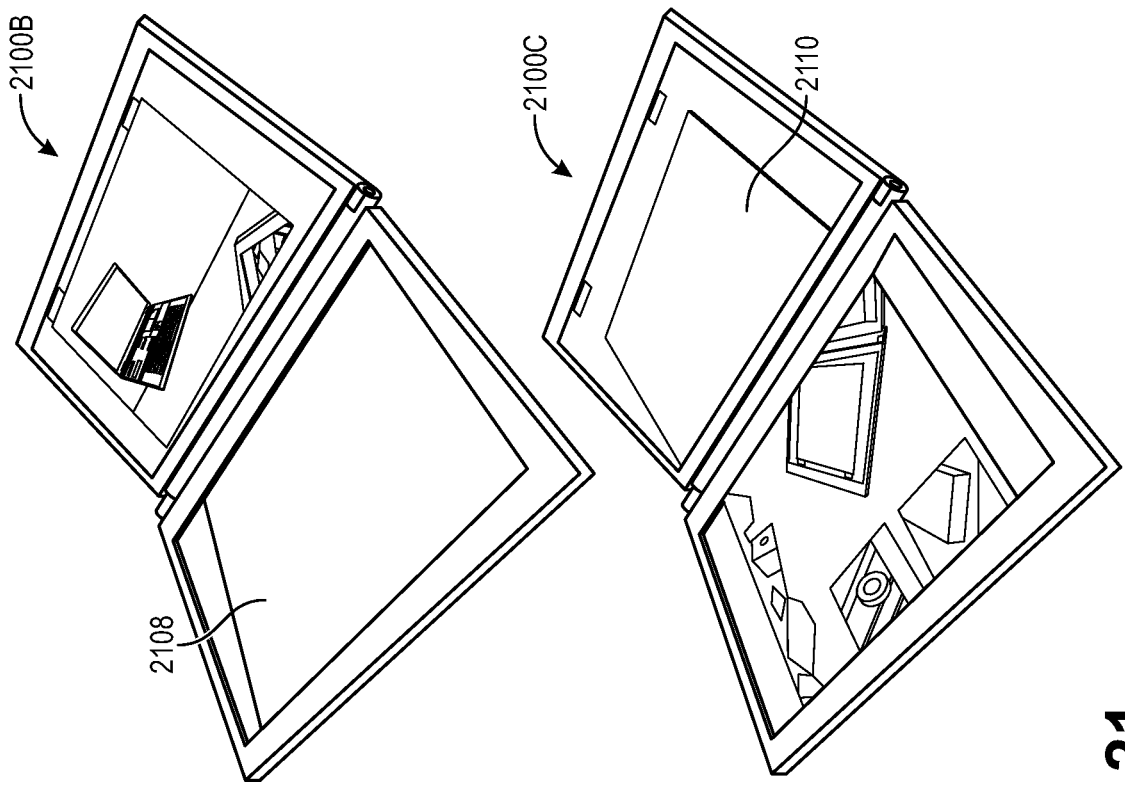
FIG. 21 shows another example of a computer with two displays where masks are used to dim areas of the two displays, in accordance with embodiments.
Figure 21:
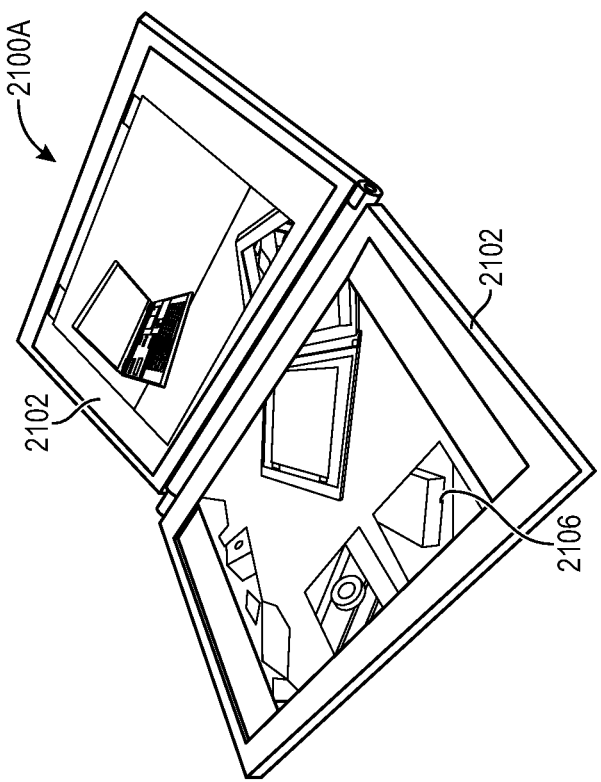

FIG. 21 shows another example of a computer with two displays where masks are used to dim areas of the two displays, in accordance with embodiments. Diagram 2100*a* shows a computer 2102 that includes two displays, an upper display 2102 and a lower display 2106. Diagram 2100*b* shows an opaque mask 2108 applied to the lower display 2106 so that only the upper display 2104 can be seen. Diagram 2100*c* shows an opaque mask 2110 applied to a portion of the upper display 2102, so that only a top portion of the upper display 2104 may be viewed.

Figure 22:
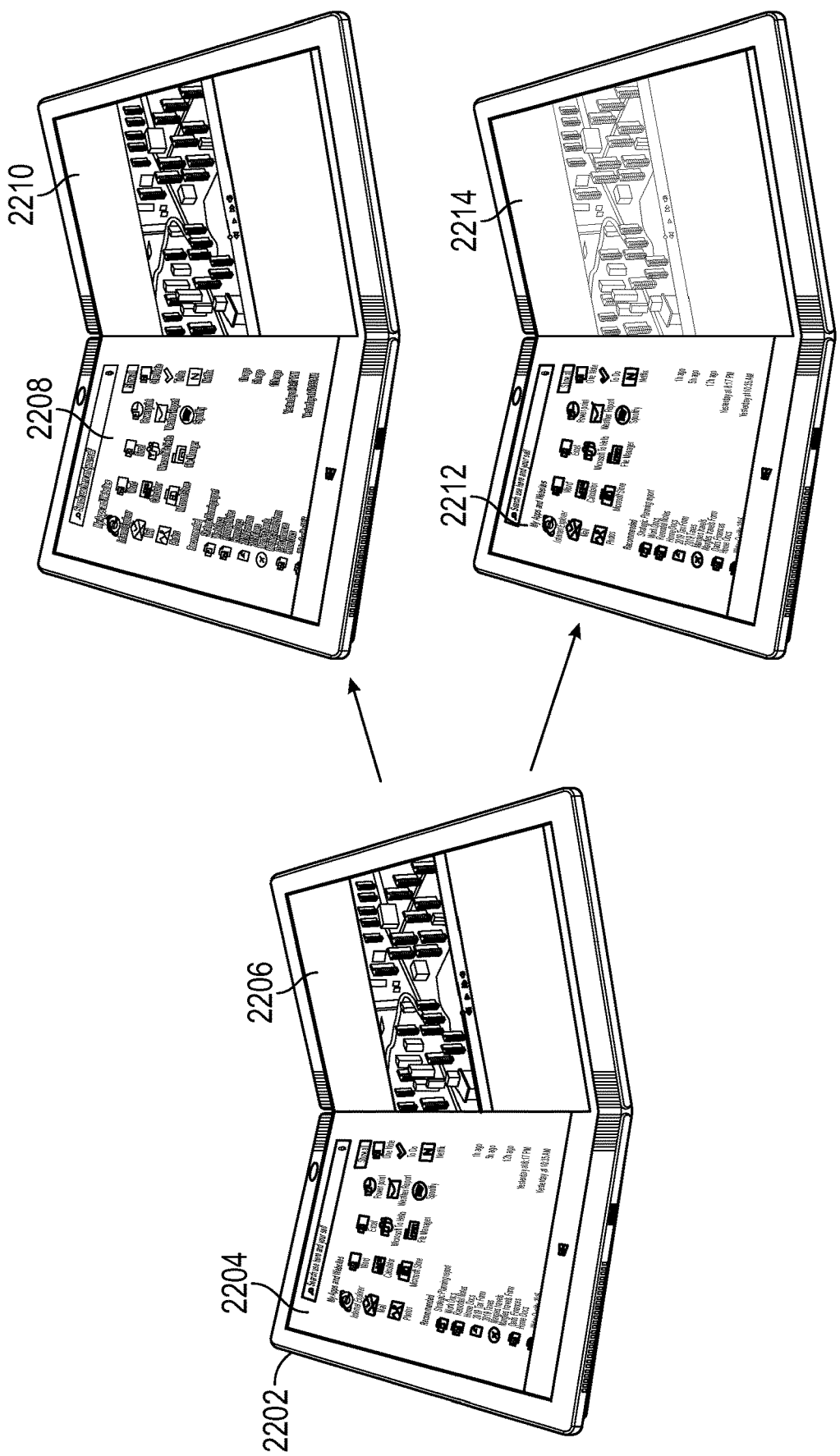
FIG. 22 shows another example using a foldable display, in accordance with various embodiments.

FIG. 22 shows another example using a foldable display, in accordance with various embodiments. Foldable display device 2202 may include two separate displays, a first display 2204 and a second display 2206 during operation of the foldable display 2202. In embodiments, in other operations, for example when the foldable display device 2202 is completely open, there may be just one large display substantially encompassing a side of the foldable display device 2202.

As shown, the partial screen dimming system may be used to apply a mask layer 2208 to the graphics displayed on the first display 2204, and applying a very transparent mask 2210 to the graphics displayed on the second display 2206. In other examples, no mask 2212 may be applied to the graphics of the first display 2204, leaving it bright, where an opaque mask 2214 may be applied to the graphics displayed on the second display 2206 causing the second display 2206 to be completely dimmed.

Figure 23:
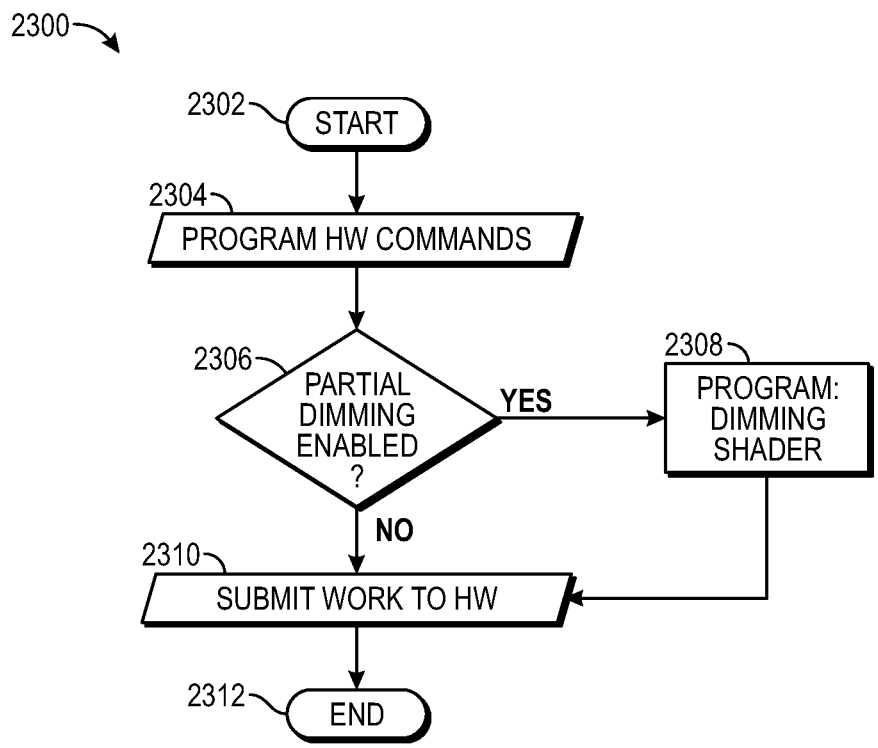
FIG. 23 shows an example process flow to dim a display using programmatic hardware commands, in accordance with embodiments.

FIG. 23 shows an example process flow to dim a display using programmatic hardware commands. Process 2300 shows an example of a process that requires specialized hardware, which may be similar to the processes described with respect to FIGS. 1-8 above. After program hardware commands are received, then an inquiry may be made whether partial dimming is enabled. If it is enabled, dimming shader is applied and the resulting images submitted to hardware.

At block 2302, the process may start. At block 2304, the process may determine and/or program hardware commands to be sent to a hardware display driver of the computing system. At block 2306, a determination may be made whether partial dimming using hardware controls is enabled. If not, control passes to block 2310. If so then at block 2308, a dimming shader process may be invoked that identifies commands to be sent to the hardware to accomplish dimming on one or more displays. At block 2310, commands are submitted to the hardware display driver, and the process ends at 2312.

Figure 24:
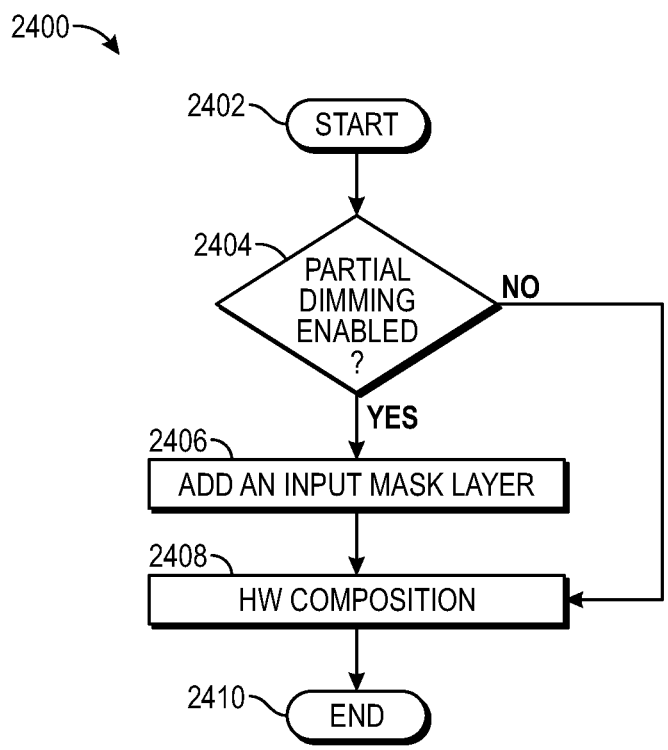
FIG. 24 shows an example process flow for applying a mask layer to implement dimming on a display, in accordance with embodiments.

FIG. 24 shows an example process flow for applying a mask layer to implement dimming on a display, in accordance with embodiments. In contrast to process 2300, process 2400 is a high-level overview process for implementing one or more embodiments of partial panel screen dimming using software and is not dependent on specific hardware. At block 2402, the process starts. At block 2404, the process determines whether partial dimming is enabled. If not, the process moves to block 2408. If so, then a block 2406 the process identifies and adds an input mask layer at the software level to combine with the graphics on the display. At block 2408, the resulting graphics that includes the input mask layer is sent to hardware composition for the resulting image to be displayed. In embodiments, the input mask may be within a single layer, or distributed to multiple layers. At block 2410, the process ends.

Figure 25:
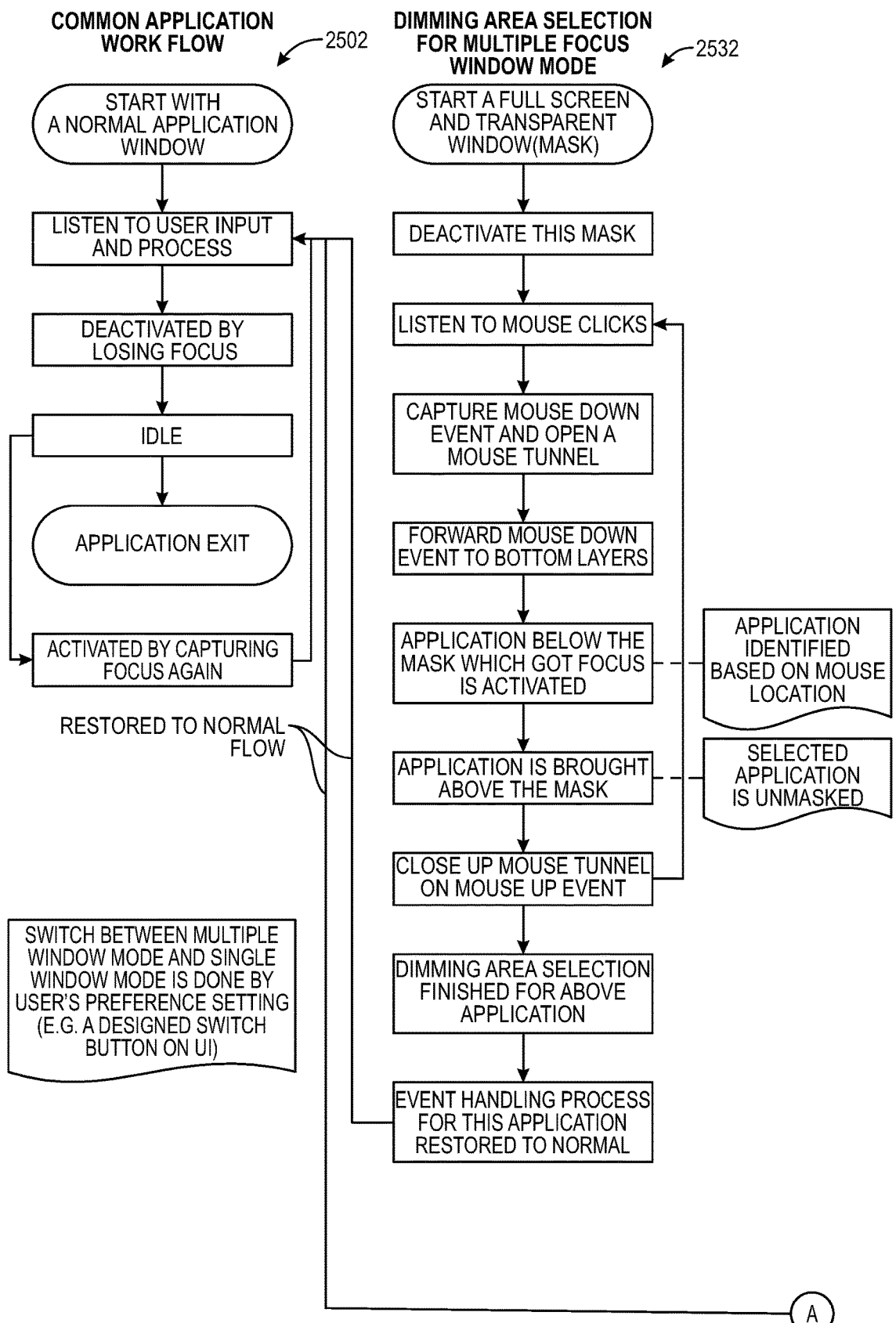
FIG. 25 shows a detailed process flow for dimming and area selection for multiple focus window and single focus window, in accordance with embodiments.
Figure 25:
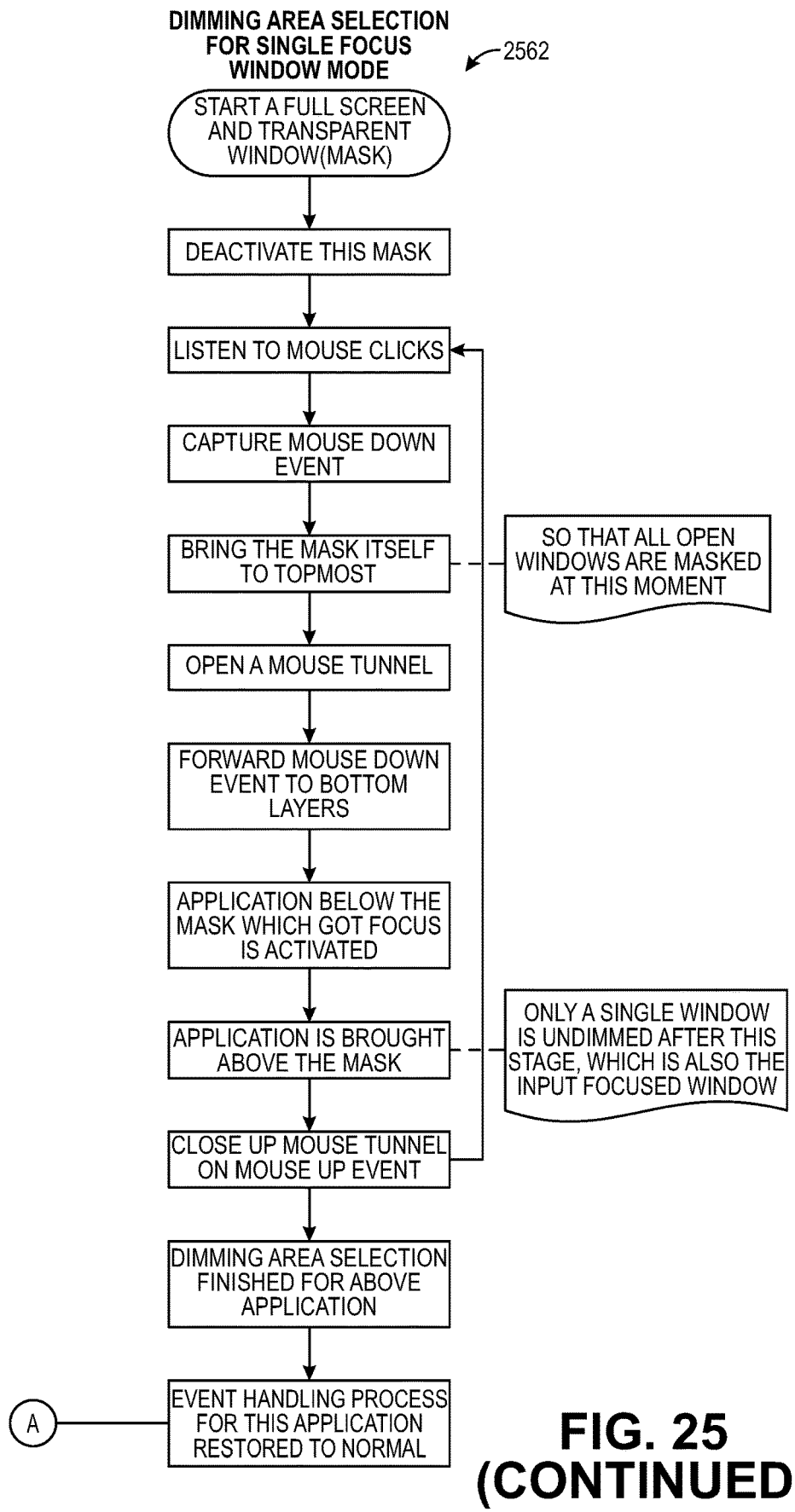

FIG. 25 shows a detailed process flow for dimming and area selection for multiple focus window and single focus window, in accordance with embodiments. Process 2500*a* represents a common application workflow, with which process 2500*b* and 2500*c* may interact. Process 2500*b* includes a set of actions to be taken in order to make a dimming area selection for a multiple focus window mode, for example where multiple areas of the display are active and accessible by the user. Process 2500*c* includes a set of actions to be taken in order to make a dimming area selection for single focus window mode.

Process 2500*a* may begin with a normal application window. The process may listen to user input, receive, and process the received user input. The input may be received after the results of process 2500*b* or 2500*c*. In embodiments, the switch between multiple window mode in single window mode may be done through a user preference setting, for example a design switch button on a user interface. The application window may subsequently be deactivated by losing focus, and subsequently enter an idle state. Subsequent to the idle state, the application window may be activated by capturing focus again, or the application may exit.

Process 2500*b* is an embodiment for a dimming area selection for multiple focus window mode. The process may start a full-screen and transparent window mask, which may be similar to mask 1502 or 1532 of FIG. 15. Subsequently, the process may deactivate the mask. Subsequently, the process may listen to mouse clicks. The process may subsequently capture a mouse down event and open a mouse tunnel. Subsequently, the process may forward the mouse down event to bottom layers. Subsequently, the process may activate an application below the mask which got focus. In embodiments, this application is identified based on mouse location. Subsequently, the application is brought above the mask layer and be activated and made visible to the user. Subsequently, the process may close up the mouse tunnel upon a mouse up event, and then go back to the action of listen to mouse clicks, and end the dim the area selection process for above application. Subsequently, the event handling process for the activated application is restored to normal.

Process 2500*c* is an embodiment for a dimming area selection for a single focus window mode. The process may start a full-screen and transparent window mask, which may be similar to mask 1502 or 1532 of FIG. 15. Subsequently, the process may deactivate the mask. Subsequently, the process may listen to mouse clicks. Subsequently, the process may capture a mouse down event. Subsequently, the process may bring the mask itself to the topmost, so that open windows are masked.

Subsequently, the process may open a mouse tunnel. Subsequently, the process may forward to mouse down event to bottom layers. Subsequently, the application below the mask which got focus is activated. Subsequently, the application may be brought above the mask, so that only a single window is undimmed after this stage, which is also the input focused window and the activated window. Subsequently, the process may close up the mouse tunnel on a mouse up event. Subsequently, the process returns to the action of listening for mouse clicks, and the dimming area selection is finished for the above application. Subsequently, the event handling of the activated application is restored to normal.

Figure 26:
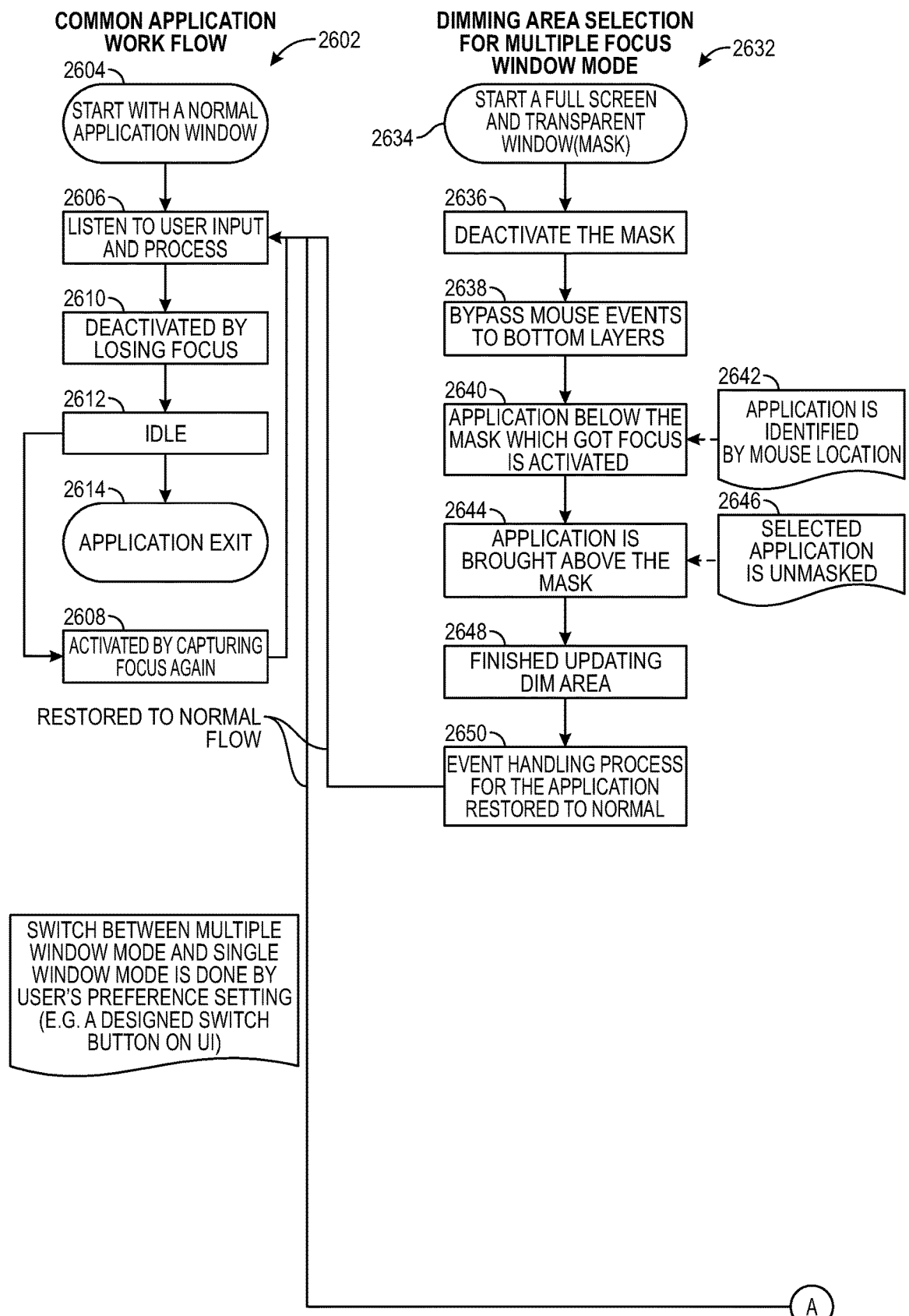
FIG. 26 shows another detailed process flow for dimming and area selection for multiple focus window and single focus window, in accordance with embodiments.
Figure 26:
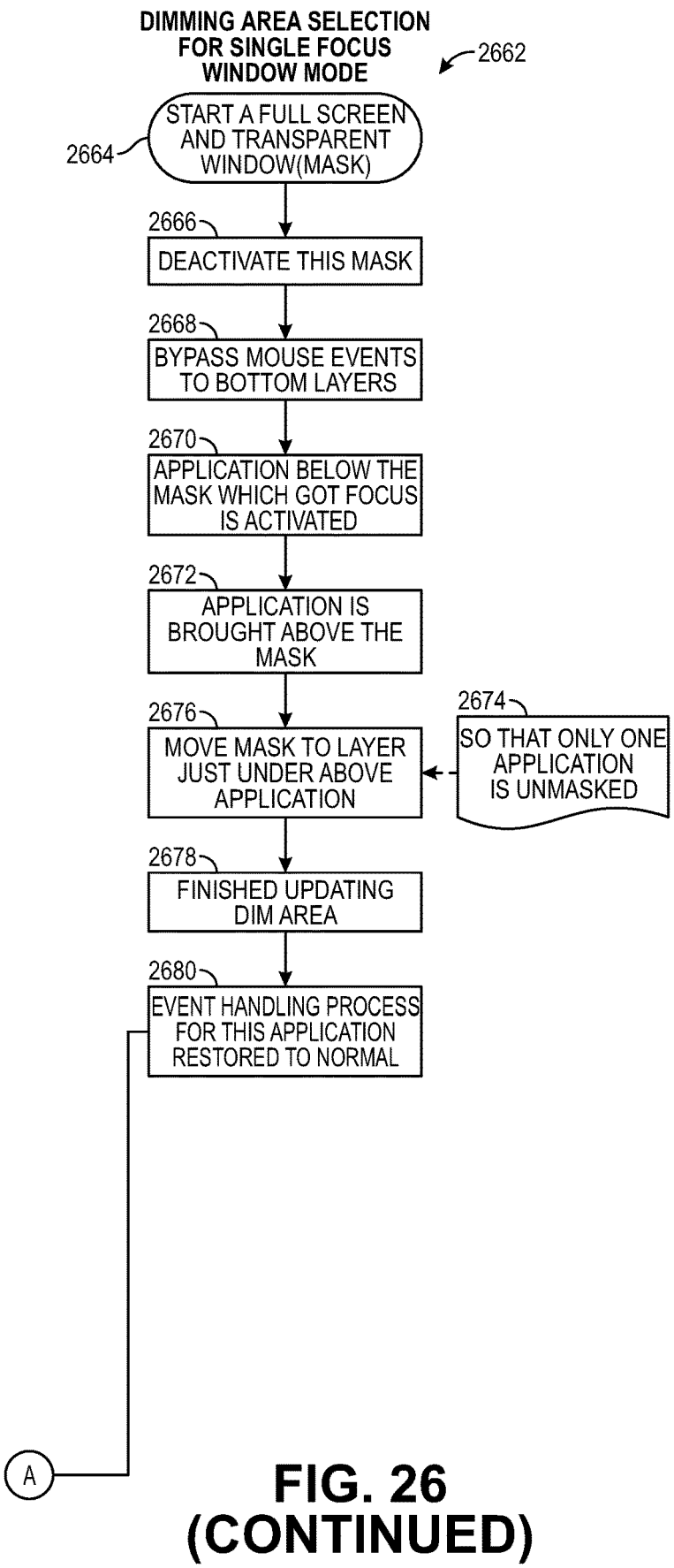

FIG. 26 shows another detailed process flow for dimming and area selection for a multiple focus window and a single focus window, in accordance with embodiments. In embodiments, a common application workflow 2602, may be incorporated as part of the dimming area selection for multiple focus windows mode process 2632, as well as the dimming area selection for single focus window mode 2662.

Embodiments discussed further below, an application window may be activated by mouse clicking is built-in and supported by Windows operating system. For example, if any in active window is clicked, then that window is activated immediately. In embodiments, bringing the activated window to topmost layer is the default behavior.

The common application workflow process 2602 may be implemented by one or more of the processes, techniques, apparatus, or systems described herein. At block 2604, the process may start with a normal application window. At block 2606, the process may listen to user input and processes. In embodiments, this may include receiving user input from a user operating a computer device with the display. In embodiments, it may include receiving handling processes for the application restored to normal from block 2650 of dimming area selection for multiple focus window mode 2632. In other embodiments, this may include receiving handling processes for the application restored to normal from block 2680 of dimming area selection for single focus window mode 2662.

At block 2610, the process may identify a window deactivated by losing focus. In embodiments, this may be based upon user input directing focus to another window on the display. At block 2612, the process may idle. At block 2608, the process may reactivate the window by capturing focus again, and proceed to block 2606. At block 2614, the process may identify an application exit, for example based on user input, and close the window.

With respect to dimming area selection for multiple focus windows 2632, this process may be implemented by one or more of the processes, techniques, apparatus, or systems described herein. At block 2634, the process may start a full-screen and transparent window, including mask layer. At block 2636, the process may deactivate the mask. At block 2638, the process may bypass mouse events to bottom layers. At 2640, the process may activate an application window that is below the mask, and at block 2642 the application may be identified by a mouse location.

At block 2644, the process may bring the application above the mask layer, which at block 2646 the selected application may be unmasked. At block 2648, the process may finish updating the dim area, and at block 2650 the process may include event handling for the application to be restored to system default behavior. The process may then proceed to block 2606.

With respect to dimming area selection for a single focus window 2661, this process may be implemented by one or more of the processes, techniques, apparatus, or systems described herein. At block 2664, the process may start a full-screen and a transparent window, including mask layer. At block 2666, the process may deactivate the mask. At block 2668, the process may bypass mouse events to bottom layers.

At 2670, the process may activate an application window that is below the mask. At block 2672, the process may bring the application window above the mask. At block 2676, the process may move the mask to a layer just under the activated application so that only one application is unmasked. At block 2678, the process may finish updating the dim area, and at block 2680, the process the process may include event handling for the application to be restored to system default behavior. The process may then proceed to block 2606.

Figure 27:
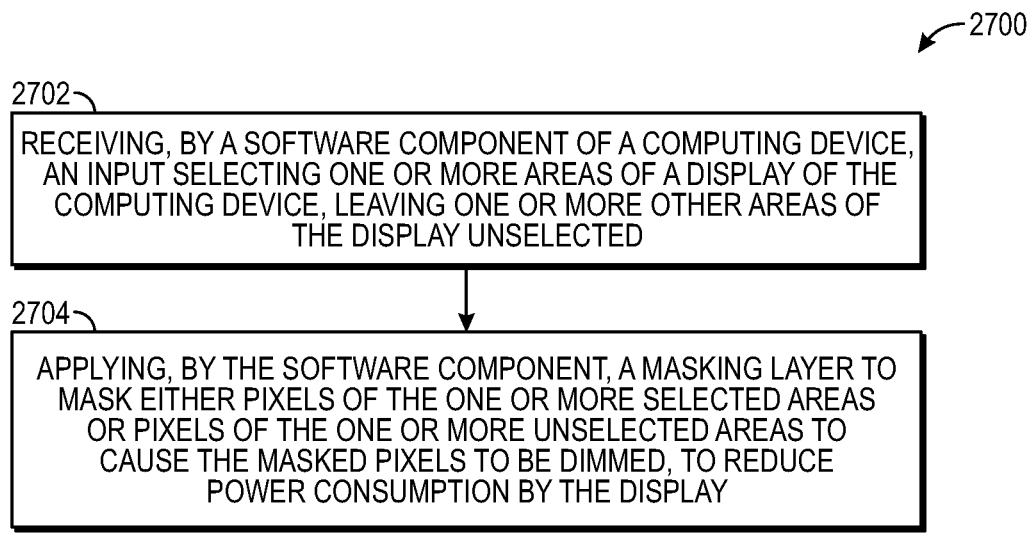
FIG. 27 shows a process for partial panel screen dimming, in accordance with embodiments.

FIG. 27 shows a process for partial panel screen dimming, in accordance with embodiments. Process 2700 may be performed using hardware, software, and techniques described herein with respect to FIGS. 1-26.

At block 2702, the process may include receiving, by a software component of a computing device, an input selecting one or more areas of a display of the computing device, leaving one or more other areas of the display unselected.

At block 2704, the process may further include applying, by the software component, a masking layer to mask either pixels of the one or more selected areas or pixels of the one or more unselected areas to cause the masked pixels to be dimmed, to reduce power consumption by the display.

Other techniques may be used for dimming the backlight outside a region of focus. These techniques may be implemented as a multistage operation, and may be related to the processes described herein, and in particular with respect to FIGS. 25-26.

First stage. In the first stage, the pixel values outside the region of focus are changed. This is done during the desktop composition stage.

One of the inputs to the dimming operation is the dim level that the user can configure. The user can also specify if the user desires a foveated dimming. In this case, the user can specify a dim gradient so that non-uniform dimming can be achieved. The algorithm can be extended to use other inputs not limited to the above.

The region of focus can be user-specified and fixed. It could also be determined by active windows without explicit input for natural user experience.

For every pixel in the Desktop Composited surface that is outside the region of focus, the shader or the algorithm uses the aforementioned inputs to change the <R,G,B> color components of the pixel so that they are darker than they were before this operation. This ends the first stage.

Second stage. In the second stage, the panel backlight is adjusted based on the frame that is displayed.

On pixel backlight panels, such as OLED panels, backlight adjustment is individually done by the panel. Based on the pixel value, the backlight is adjusted in such a way that the user doesn't notice the change. For darker values, the backlight can be reduced individually to a greater extent.

On global backlight panels such as LCD panels which do not support a per pixel panel backlight adjustment, power saving features like Intel® Display Power Saving Technology (DPST) or Content Adaptive Brightness control (CABC) etc. can be used. In DPST or CABC, depending on the percentage of dark pixels in the frame being displayed and upon meeting a set threshold for that, either the display hardware (in the case of DPST) or the timing controller (TCON) in the panel (in the case of CABC) change the backlight settings of the panel in such a way that the user doesn't notice the change when the backlight is reduced. This ends the second stage.

In either case, when the panel is OLED or LCD, the first stage causes the pixels outside the region of focus to be darker which triggers the backlight reduction in the panel causing partial panel dimming, which ultimately brings the panel backlight power savings. The same techniques can be for a system that has more than one single display.

Figure 28:
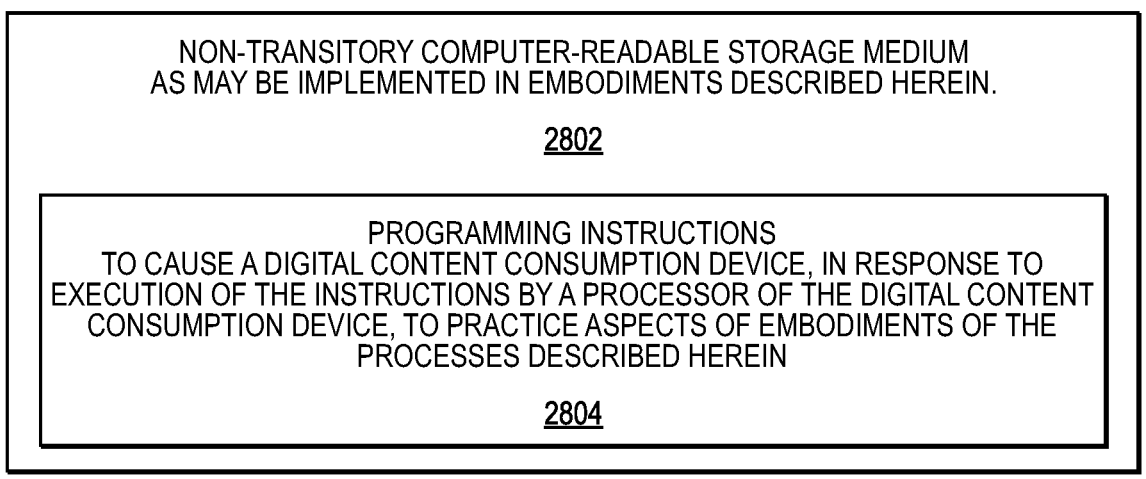
FIG. 28 shows a non-transitory computer readable storage medium that includes instructions to implement one or more processes to cause partial panel screen dimming.

FIG. 28 shows a non-transitory computer readable storage medium that includes instructions to implement one or more processes to cause partial panel screen dimming. Diagram 2000 shows a non-transitory computer readable storage medium 2002, the may be implemented in embodiments described herein. For example, the computer readable storage medium may be stored within computing system 800 of FIG. 8, in particular the memory 804 or other storage 818. The computer readable storage medium 2002 may contain programming instructions 2004 that may be executed by processor 802 of FIG. 8.

EXAMPLES

Each of the following non-limiting examples may stand on its own, or may be combined in various permutations or combinations with one or more of the other examples.

Example 1 is a method, comprising: determining one or more areas of a display to remain active in response to received user input; determining one or more areas of the display to be dimmed in response to the received user input; and dimming the one or more areas of the display to be dimmed to reduce a power consumption of the display.

Example 2 is the subject matter of Example 1, wherein the received user input comprises at least one of: cursor information received from a mouse; keystroke information received from a keyboard; touch information received from a touch screen; a position of the eyes of the user indicating a location on the display where the user is looking; a voice command from the user; manual input received from a user; or a power policy setting of an electronic device including the display.

Example 3 is the subject matter of any one or more of Examples 1-2, wherein the display comprises a plurality of pixels, and wherein dimming the one or more areas of the display to be dimmed comprises dimming at least some of the pixels of the display in the one or more areas of the display to be dimmed.

Example 4 is the subject matter of any one or more of Examples 1-3, wherein dimming at least some of the pixels of the display in the one or more areas of the display to be dimmed comprises changing a color of at least some of the plurality of pixels of the display in the one or more areas of the display to be dimmed.

Example 5 is the subject matter of any one or more of Examples 1-4, wherein changing a color of at least some of the plurality of pixels of the display in the one or more areas of the display to be dimmed comprises changing the color to black or darker color.

Example 6 is the subject matter of any one or more of Examples 1-5, wherein the display includes a plurality of displays and wherein dimming one or more areas of the display to be dimmed comprises dimming one or more areas on each of the plurality of displays.

Example 7 is the subject matter of any one or more of Examples 1-6, wherein dimming one or more areas on each of the plurality displays comprises turning off one or more of the plurality of displays.

Example 8 is the subject matter of any one or more of Examples 1-7 further comprising enabling and disabling dimming the one or more areas of the display to be dimmed in response to received user input.

Example 9 is a non-transitory machine-readable medium storing a program executable by at least one processing unit of an electronic device including a display, the program comprising sets of instructions for: determining one or more areas of the display to remain active in response to received user input; determining one or more areas of the display to be dimmed in response to the received user input; and dimming the one or more areas of the display to be dimmed to reduce a power consumption of the display.

Example 10 is the subject matter of Example 9, wherein the program comprises a set of instructions in a desktop composition module of the electronic device.

Example 11 is the subject matter of any one or more of Examples 9-10, wherein the electronic device executes the Windows operating system, and wherein the desktop composition module comprises the desktop windows manager (DWM) of the Windows operating system.

Example 12 is the subject matter of any one or more of Examples 9-11, wherein the program comprises a set of instructions in a graphics driver of the electronic device.

Example 13 is the subject matter of any one or more of Examples 9-12, wherein the program further comprises a set of instructions of a plugin of the graphics driver.

Example 14 is the subject matter of any one or more of Examples 9-13, wherein the plugin comprises a set of instructions for receiving, from an operating system of the electronic device, the received user input.

Example 15 is a system, comprising: one or more displays; a set of processors; and a non-transitory computer-readable medium storing a set of instructions that when executed by at least one processor in the set of processors cause the at least one processor to: determine one or more areas of the one more displays that are to remain active in response to user input; determine one or more areas of the one more displays that are to be dimmed in response to the user input; and dim the one or more areas of the one or more displays to be dimmed to reduce a power consumption of the one or more displays.

Example 16 is the subject matter of Example 15, wherein the set of instructions stored in the non-transitory computer-readable medium comprise instructions in a desktop composition module of the system.

Example 17 is the subject matter of any one or more of Examples 15-16, wherein the non-transitory computer-readable medium stores instructions of the Windows operating system, and wherein the desktop composition module comprises the desktop windows manager (DWM) of the Windows operating system.

Example 18 is the subject matter of any one or more of Examples 15-17, wherein the set of instructions stored in the non-transitory computer-readable medium further comprise a set of instructions of a graphics driver of the system.

Example 19 is the subject matter of any one or more of Examples 15-18, wherein the set of instructions stored in the non-transitory computer-readable medium include a plugin of the graphics driver.

Example 20 is the subject matter of any one or more of Examples 15-19, wherein the graphics driver includes a dimming shader program and the dimming shader program includes the plugin comprising a set of instructions for receiving, from an operating system of the system, the user input.

Example 21 is a computer implemented method for operating a display, the method comprising: receiving, by a software component of a computing device, an input selecting one or more areas of a display of the computing device, leaving one or more other areas of the display unselected; and applying, by the software component, a masking layer to mask either pixels of the one or more selected areas or pixels of the one or more unselected areas to cause the masked pixels to be dimmed, to reduce power consumption by the display.

Example 22 includes the method of example 21, wherein the one or more of the selected areas include a focus area of interest, and the applying comprises applying the masking layer to mask pixels of the one or more unselected areas to cause the masked pixels to be dimmed.

Example 23 includes the method of example 22, wherein the focus area includes an active application window.

Example 24 includes the method of example 22, further comprising modifying, by the software component the masking layer, in response to the selection of the focus area.

Example 25 includes the method of example 24, further comprising modifying, by the software component the masking layer, in response to changing dimensions of the focus area.

Example 26 includes the method of example 22, wherein the applying of the masking layer to mask pixels of the one or more unselected areas to cause the masked pixels to be dimmed comprises applying the masking layer to mask pixels of the one or more unselected areas to cause the masked pixels to be dimmed non-uniformly.

Example 27 includes a method of example 21, wherein the receiving of the input selecting one or more areas of the display comprises receiving the input selecting the one or more areas of the display from a user input device of the computing device.

Example 28 includes the method of any one of examples 21-27, wherein the masking layer includes transparency layers associated with the pixels to be dimmed, and the applying comprises alpha blending the transparency layers associated with the pixels to be dimmed to respectively dim the pixels.

Example 29 is a computer readable media comprising instructions that cause a computing device, in response to execution of the instructions by one or more processors of the computing device, to operate a display dimming engine to: receive an input selecting one or more areas of a display of the computing device, leaving one or more other areas of the display unselected; and apply a masking layer to mask either pixels of the one or more selected areas or pixels of the one or more unselected areas to cause the masked pixels to be dimmed, to reduce power consumption by the display.

Example 30 includes the computer readable media of example 29, wherein the one or more of the selected areas include a focus area of interest, and to apply comprises to apply the masking layer to mask pixels of the one or more unselected areas to cause the masked pixels to be dimmed.

Example 31 includes the computer readable media of example 30, wherein the focus area includes an active application window.

Example 32 includes the computer readable media of example 11, further comprising to modify the masking layer, in response to the selection of the focus area.

Example 33 includes the computer readable media of example 31, further comprising to modify the masking layer, in response to changing dimensions of the focus area.

Example 34 includes the computer readable media of example 30, wherein to apply the masking layer to mask pixels of the one or more unselected areas to cause the masked pixels to be dimmed comprises to apply the masking layer to mask pixels of the one or more unselected areas to cause the masked pixels to be dimmed non-uniformly.

Example 35 includes the computer readable media of example 29, wherein to receive the input selecting one or more areas of the display comprises to receive the input selecting the one or more areas of the display from a user input device of the computing device.

Example 36 includes the computer readable media of any one of examples 29-35, wherein the masking layer includes transparency layers associated with the pixels to be dimmed, and to apply comprises alpha blending the transparency layers associated with the pixels to be dimmed to respectively dim the pixels.

Example 37 is a computing apparatus comprising: means for receiving an input selecting one or more areas of a display of the computing device, leaving one or more other areas of the display unselected; and means for applying a masking layer to mask either pixels of the one or more selected areas or pixels of the one or more unselected areas to cause the masked pixels to be dimmed, to reduce power consumption by the display.

Example 38 includes the computing apparatus of example 37, wherein the one or more of the selected areas include a focus area of interest, and means for applying comprises means for applying the masking layer to mask pixels of the one or more unselected areas to cause the masked pixels to be dimmed.

Example 39 includes the computing apparatus of example 37, wherein the focus area includes an active application window.

Example 40 includes the computing apparatus of any one of examples 37-39, further comprising means for modifying the masking layer, in response to the selection of the focus area.

The above description illustrates various embodiments of the present disclosure along with examples of how aspects of the particular embodiments may be implemented. The above examples should not be deemed to be the only embodiments and are presented to illustrate the flexibility and advantages of the particular embodiments covered by the following claims. Based on the embodiments described in the present disclosure, other arrangements, embodiments, implementations and equivalents may be employed without departing from the scope of the present disclosure.

What is claimed is:

1. A computer implemented method for operating a display, the method comprising:
   receiving, by a software component of a computing device, an input selecting a first area that includes an entirety of a first active application window on the display of the computing device, leaving a second area that includes at least a portion of an entirety of a second application window of the display outside the first active application window unselected; and
   applying, by the software component, a masking layer to mask either pixels of the first area or pixels of the second area to cause the masked pixels to be dimmed and to form a border around at least a portion of the second area, wherein a dimming level of the border is different than a dimming level of the second area, to reduce power consumption by the display.

2. The method of claim 1, wherein the first area includes a focus area of interest, and the applying comprises applying the masking layer to mask pixels surrounding the focus area of interest.

3. The method of claim 2, further comprising modifying, by the software component, the masking layer, in response to a selection of the focus area.

4. The method of claim 1, further comprising modifying, by the software component, the masking layer in response to changing dimensions of the first active application window.

5. The method of claim 1, wherein the masked pixels cause the dimming level to be non-uniform.

6. The method of claim 1, wherein the input is received from a user input device of the computing device.

7. The method of claim 1, wherein the masking layer includes transparency layers associated with the pixels to be dimmed, and the applying comprises alpha blending the transparency layers associated with the pixels to be dimmed to respectively dim the pixels.

8. A computer readable media comprising instructions that cause a computing device, in response to execution of the instructions by one or more processors of the computing device, to operate a display dimming engine to:
   receive an input selecting a first area that includes an entirety of a first active application window of a display of the computing device, leaving a second area that includes at least a portion of an entirety of a second application window of the display outside the first active application window unselected; and
   apply a masking layer to mask at least some pixels on the display to form a border around at least a portion of the second area.

9. The computer readable media of claim 8, wherein to apply the masking layer is to cause the masked pixels to be dimmed.

10. The computer readable media of claim 8, further comprising to modify the masking layer, in response to a selection of the second area on the display.

11. The computer readable media of claim 8, further comprising to modify the masking layer, in response to changing dimensions of the first area.

12. The computer readable media of claim 8, wherein the masked pixels are dimmed non-uniformly.

13. The computer readable media of claim 8, wherein to receive the input comprises to receive the input from a user input device of the computing device.

14. The computer readable media of claim 8, wherein the masking layer includes transparency layers associated with the pixels to be dimmed, and to apply comprises alpha blending the transparency layers associated with the pixels to be dimmed to respectively dim the pixels.

15. A computing apparatus comprising:
means for receiving an input selecting a first area that includes an entirety of a first active application window on a display of the computing apparatus, leaving a second area that includes at least a portion of an entirety of a second application window of the display unselected; and
means for applying a masking layer to mask either pixels of the first area or pixels of the second area to cause the masked pixels to be dimmed and to form a border around at least a portion of the second area, wherein a dimming level of the border is brighter than a dimming level of the second area.

16. The computing apparatus of claim 15, wherein the first area includes a focus area of interest, and means for applying comprises means for applying the masking layer to mask pixels surrounding the focus area of interest.

17. The computing apparatus of claim 15, further comprising means for modifying the masking layer, in response to a change of dimension of the first area.

\* \* \* \* \*